(12) United States Patent
Harris et al.

(10) Patent No.: US 12,718,686 B2
(45) Date of Patent: Aug. 25, 2026

(54) SYSTEMS AND METHODS FOR POSITIONAL LICENSE PLATE CHARACTER SEQUENCE IDENTIFICATION IN VEHICLE SERVICE FACILITIES

(71) Applicant: MW POS, Inc., Arlington, VA (US)

(72) Inventors: Nathan Alan Harris, Washington, DC (US); Joshua Richard Dotson, Cuyahoga Falls, OH (US); James Hodges McAliley, Charleston, SC (US); Aaron Mykal Clint, Stewartsville, MT (US); Jonathan David Hester, Charlotte, NC (US)

(73) Assignee: MW POS, Inc., Arlington, VA (US)

( * ) Notice: Subject to any disclaimer, the term of this patent is extended or adjusted under 35 U.S.C. 154(b) by 0 days.

(21) Appl. No.: 19/305,171

(22) Filed: Aug. 20, 2025

(65) Prior Publication Data

US 2026/0087927 A1 Mar. 26, 2026

Related U.S. Application Data

(63) Continuation of application No. 19/188,968, filed on Apr. 24, 2025, now Pat. No. 12,406,575, which is a
(Continued)

(51) Int. Cl.

| | |
|---|---|
| ***G08G 1/017*** | (2006.01) |
| ***B60S 3/00*** | (2006.01) |

(Continued)

(52) U.S. Cl.

CPC .............. *G08G 1/0175* (2013.01); *B60S 3/00* (2013.01); *B60S 3/04* (2013.01); *G05B 15/02* (2013.01);

(Continued)

(58) Field of Classification Search

CPC ....... G06V 20/00; G06V 20/62; G06V 20/625
See application file for complete search history.

(56) References Cited

U.S. PATENT DOCUMENTS

| | | | | |
|---|---|---|---|---|
| 9,405,988 B2 * | 8/2016 | Alves | .................. | G06V 10/987 |
| 11,715,311 B1 * | 8/2023 | Commeyne | ............. | G06F 18/10 382/105 |

(Continued)

FOREIGN PATENT DOCUMENTS

| | | |
|---|---|---|
| CN | 105205499 A | 12/2015 |
| JP | 2000-255392 A | 9/2000 |
| JP | 2020-135898 A | 8/2020 |

OTHER PUBLICATIONS

International Search Report and Written Opinion on International Patent Application No. PCT/US2025/048215, mailed Mar. 3, 2026 (23 pages).

*Primary Examiner* — Molly Wilburn
(74) *Attorney, Agent, or Firm* — Foley & Lardner LLP

(57) ABSTRACT

Technical solutions are directed to a system including one or more processors, coupled with memory. The one or more processors can maintain a plurality of vehicle profiles for a plurality of vehicles. The one or more processors can capture one or more images of at least a portion of a vehicle, identify, using the one or more images, a first sequence of characters of a license plate of the vehicle and determine one or more characters of the first sequence of characters that satisfy a character replacement schema. The one or more processors can generate a second sequence of characters including one or more corresponding replacement characters in the first sequence of characters, identify, a vehicle profile of the vehicle based on executing a query using the generated second sequence of characters, and transmit, to a device, data included in the vehicle profile based on identifying the vehicle profile.

14 Claims, 9 Drawing Sheets

Related U.S. Application Data continuation of application No. 19/081,757, filed on Mar. 17, 2025.

(60) Provisional application No. 63/738,281, filed on Dec. 23, 2024, provisional application No. 63/699,778, filed on Sep. 26, 2024.

(51) Int. Cl.

| | |
|---|---|
| ***B60S 3/04*** | (2006.01) |
| ***G05B 15/02*** | (2006.01) |
| ***G05D 1/224*** | (2024.01) |
| ***G06T 7/00*** | (2017.01) |
| ***G06V 20/54*** | (2022.01) |
| ***G06V 20/62*** | (2022.01) |

(52) U.S. Cl.

CPC ............. *G05D 1/224* (2024.01); *G06T 7/001* (2013.01); *G06V 20/54* (2022.01); *G06V 20/625* (2022.01); *G06V 2201/08* (2022.01)

(56) References Cited

U.S. PATENT DOCUMENTS

| | | | | |
|---|---|---|---|---|
| 2001/0020198 | A1 | 9/2001 | Wilson | |
| 2002/0140577 | A1* | 10/2002 | Kavner | G07B 15/063 340/928 |
| 2006/0180647 | A1* | 8/2006 | Hansen | G07F 17/20 235/375 |
| 2008/0222004 | A1 | 9/2008 | Pollock et al. | |
| 2009/0057401 | A1* | 3/2009 | Brott | G06Q 20/28 235/382 |
| 2011/0288909 | A1* | 11/2011 | Hedley | G07B 15/06 705/13 |
| 2013/0204798 | A1 | 8/2013 | Gabrysch et al. | |
| 2015/0049914 | A1* | 2/2015 | Alves | G06V 20/63 382/105 |
| 2017/0140237 | A1* | 5/2017 | Voeller | G06V 20/63 |
| 2018/0268238 | A1 | 9/2018 | Khan et al. | |
| 2019/0043201 | A1* | 2/2019 | Strong | G06V 10/96 |
| 2019/0279181 | A1 | 9/2019 | Kelly et al. | |
| 2020/0294052 | A1* | 9/2020 | Cacciami | G07B 15/00 |
| 2021/0150499 | A1* | 5/2021 | Fazio | G07F 17/20 |
| 2022/0092996 | A1 | 3/2022 | Korngold et al. | |
| 2023/0004899 | A1 | 1/2023 | Van Breen | |
| 2023/0249653 | A1* | 8/2023 | Stoel | G06Q 20/34 705/1.1 |
| 2024/0185566 | A1 | 6/2024 | Thomas et al. | |
| 2024/0311937 | A1 | 9/2024 | Siefken et al. | |
| 2024/0331393 | A1* | 10/2024 | Petrey, Jr. | G08B 27/003 |
| 2024/0378570 | A1 | 11/2024 | Steele et al. | |
| 2024/0378925 | A1* | 11/2024 | Nichols | G06N 7/01 |

* cited by examiner

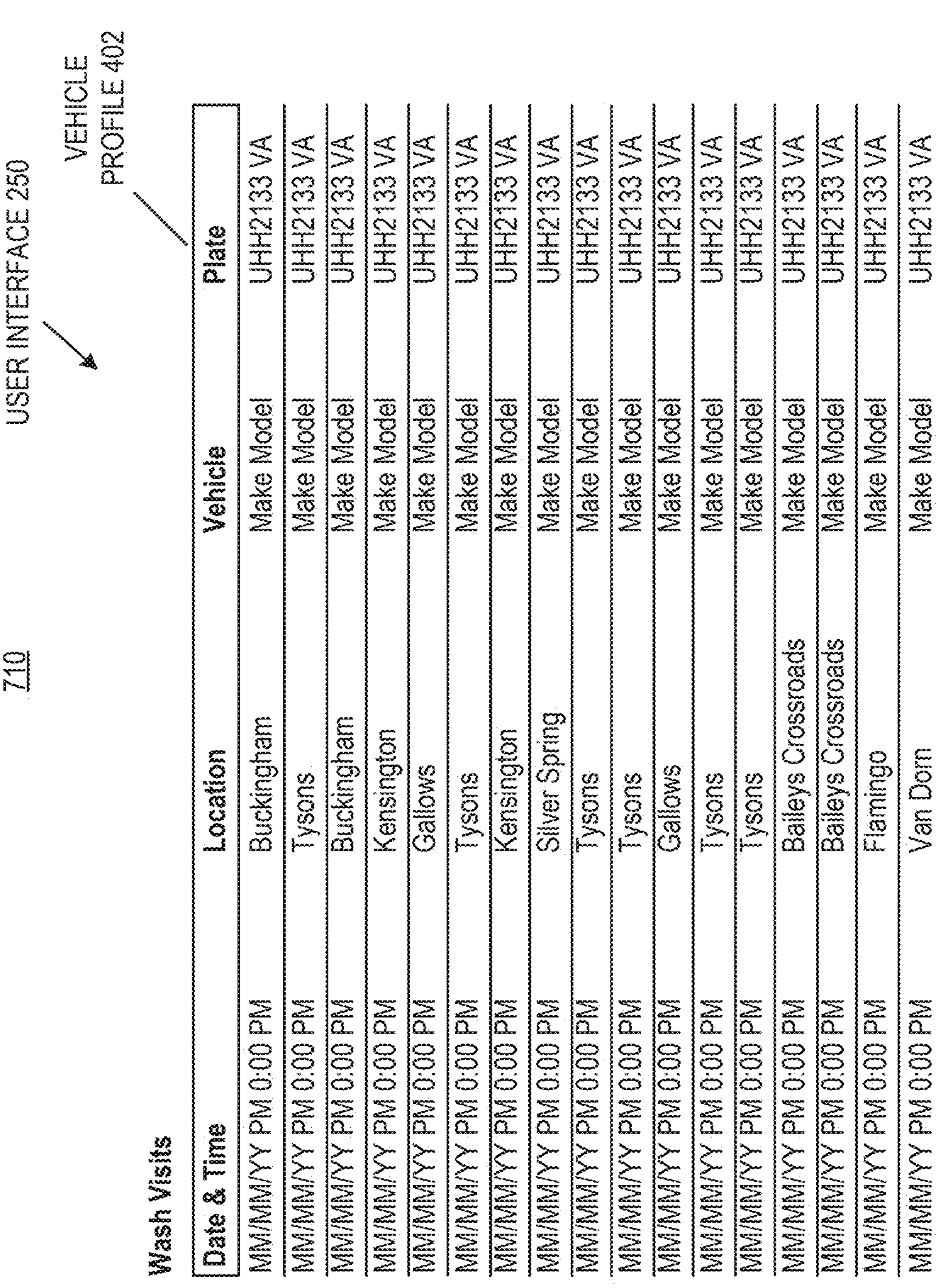

| Date & Time | Location | Vehicle | Plate |
|---|---|---|---|
| MM/MM/YY PM 0:00 PM | Buckingham | Make Model | UHH2133 VA |
| MM/MM/YY PM 0:00 PM | Tysons | Make Model | UHH2133 VA |
| MM/MM/YY PM 0:00 PM | Buckingham | Make Model | UHH2133 VA |
| MM/MM/YY PM 0:00 PM | Kensington | Make Model | UHH2133 VA |
| MM/MM/YY PM 0:00 PM | Gallows | Make Model | UHH2133 VA |
| MM/MM/YY PM 0:00 PM | Tysons | Make Model | UHH2133 VA |
| MM/MM/YY PM 0:00 PM | Kensington | Make Model | UHH2133 VA |
| MM/MM/YY PM 0:00 PM | Silver Spring | Make Model | UHH2133 VA |
| MM/MM/YY PM 0:00 PM | Tysons | Make Model | UHH2133 VA |
| MM/MM/YY PM 0:00 PM | Tysons | Make Model | UHH2133 VA |
| MM/MM/YY PM 0:00 PM | Gallows | Make Model | UHH2133 VA |
| MM/MM/YY PM 0:00 PM | Tysons | Make Model | UHH2133 VA |
| MM/MM/YY PM 0:00 PM | Tysons | Make Model | UHH2133 VA |
| MM/MM/YY PM 0:00 PM | Baileys Crossroads | Make Model | UHH2133 VA |
| MM/MM/YY PM 0:00 PM | Baileys Crossroads | Make Model | UHH2133 VA |
| MM/MM/YY PM 0:00 PM | Flamingo | Make Model | UHH2133 VA |
| MM/MM/YY PM 0:00 PM | Van Dorn | Make Model | UHH2133 VA |

FIG. 7B

SYSTEMS AND METHODS FOR POSITIONAL LICENSE PLATE CHARACTER SEQUENCE IDENTIFICATION IN VEHICLE SERVICE FACILITIES

CROSS-REFERENCES TO RELATED APPLICATIONS

This application claims the benefit of priority under 35 U.S.C. § 120 and is a continuation of U.S. Non-Provisional patent application Ser. No. 19/188,968, filed Apr. 24, 2025, which claims the benefit of priority under 35 U.S.C. § 120 and is a continuation of U.S. Non-Provisional patent application Ser. No. 19/081,757, filed Mar. 17, 2025, which claims the benefit of priority under 35 U.S.C. § 119 to U.S. Provisional Patent Application No. 63/699,778, filed Sep. 26, 2024, and to U.S. Provisional Patent Application No. 63/738,281, filed Dec. 23, 2024, all of which are hereby incorporated by reference herein in their entirety and for all purposes.

BACKGROUND

Vehicle service facilities, including car wash establishments, have evolved to meet the growing demand for efficient and convenient vehicle care. These facilities can include various devices, systems and machinery to automate different aspects of the services provided, including various car wash systems for servicing different vehicles.

SUMMARY

Technical solutions described herein are directed to systems and methods for automating vehicle service facility operations using advanced image recognition, intelligent traffic management, and customized service delivery. Automated vehicle service facilities, such as car wash facilities, can experience technical challenges, such as when identifying vehicles with pre-paid services when vehicle license plates are deformed or obscured or when detecting fraudulent license plate changes between vehicles, all of which can hinder efficient and error-free operations. These issues can lead to various operational challenges, involving client misidentification, inefficient traffic flow management, and difficulties in automating service customization based on vehicle data, leading to corrective actions to redo these operations, thereby wasting system resources and energy.

To overcome these challenges, the technical solutions utilize an image capture and recognition system to provide a reliable license plate identification, improving the traffic management, and automating resource allocation for services. In doing so, the technical solutions allow for improved automation and reduction of operational errors, resulting in resource and energy savings and improved customer satisfaction. The technical solutions can provide rapid license plate reading using character substitution for quick lookup. This system can provide image capture devices to obtain vehicle license plate images upon entry to a facility. The captured images can be processed using character recognition tools, which can include a substitution or an encoding mechanism for commonly mistaken characters (e.g., "0" for "O", "1" for "I" or "1"). This substitution or encoding approach can allow for more efficient and improved license plate identification, even in challenging conditions, such as when plates are muddy or deformed.

At least one aspect of the technical solutions is directed to a system. The system can include one or more processors, coupled with memory. The one or more processors can maintain, in a database, a plurality of vehicle profiles for a plurality of vehicles, each vehicle profile of the plurality of vehicle profiles including license plate information of a respective vehicle of the plurality of vehicles. The one or more processors can capture, via an image capture device, one or more images of at least a portion of a vehicle positioned within a region of interest of a service facility and identify, using the one or more images, a first sequence of characters of a license plate of the vehicle. The one or more processors can determine one or more characters of the first sequence of characters that satisfy a character replacement schema and generate a second sequence of characters by replacing the one or more characters that satisfy the character replacement schema with one or more corresponding replacement characters in the first sequence of characters. The one or more processors can identify, from the plurality of vehicle profiles maintained in the database, a vehicle profile of the vehicle positioned within the region of interest based on executing a query using the generated second sequence of characters and transmit, to a device, data included in the vehicle profile based on identifying the vehicle profile.

In some implementations, the data transmitted to the device is data for presentation at the device and wherein the device is one of an operator device, an administrator device or a point of sale device of a third party server. To transmit, to the device, data can include the one or more processors being configured to transmit, to a car wash controller, instructions to cause the car wash to provide a car wash type corresponding to the vehicle profile of the vehicle. The one or more processors can compare, using a lookup table, the one or more characters of the first sequence with a plurality of replacement characters comprising the one or more corresponding replacement characters, match, using the comparison, the one or more characters of the first sequence with the one or more corresponding replacement characters, and determine, based on the match, that the one or more characters of the first sequence satisfies the character replacement schema. The one or more processors can select, using a lookup table configured to relate characters of license plates with replacement characters for the license plates, one or more representative character pairs corresponding to the one or more characters of the first sequence and generate the second sequence of characters, responsive to the selection.

In some implementations, the lookup table relates the one or more characters of the first sequence with the one or more corresponding replacement characters and the one or more representative character pairs include relate at least one of: a character "1" and a character "I", a character "2" and a character "Z", a character "5" and a character "S", a character "0" and a character "O", or a character "A" and a character "4". The one or more processors can retrieve, based on the vehicle profile, a setting for a car wash routine of a vehicle service at the service facility and actuate a component controlling access to the service facility to initiate the car wash routine, based on the setting. The one or more processors can identify, based on the one or more images, a characteristic of the vehicle, compare the characteristic with one or more characteristics of the vehicle determined based on prior captured images, and detect, based on the comparison, a discrepancy between the characteristic and the one or more characteristics. The one or more processors can detect, based on the discrepancy, a fraudulent activity and generate an alert to display on a device to indicate the fraudulent activity.

In some implementations, the one or more processors can determine, based on the discrepancy, that multiple vehicles have used the license plate for services of the service facility and update information on the vehicle profile responsive to the determination that the multiple vehicles have used the license plate. The one or more processors can maintain an image log of the vehicle, the image log comprising one or more prior captured images indexed according to the license plate information and compare the one or more images of the vehicle with the one or more prior captured images to detect discrepancies in vehicle characteristics. The one or more processors can identify, based on the vehicle profile, a service setting for the vehicle, generate, based on the service setting, a service to be provided to the vehicle, and provide, for display on a device, a prompt for the service to be provided. The one or more processors can receive, responsive to the prompt, an update to the service to be provided and store, in the vehicle profile, the updated service as the service setting.

At least one aspect of the technical solutions is directed to a method. The method can include maintaining, by one or more processors, in a database, a plurality of vehicle profiles for a plurality of vehicles, each vehicle profile of the plurality of vehicle profiles including license plate information of a respective vehicle of the plurality of vehicles. The method can include capturing, by the one or more processors, via an image capture device, one or more images of at least a portion of a vehicle positioned within a region of interest of a service facility and identifying, by the one or more processors, using the one or more images, a first sequence of characters of a license plate of the vehicle. The method can include determining, by the one or more processors, one or more characters of the first sequence of characters that satisfy a character replacement schema and generating, by the one or more processors, a second sequence of characters by replacing the one or more characters that satisfy the character replacement schema with one or more corresponding replacement characters in the first sequence of characters. The method can include identifying, by the one or more processors, from the plurality of vehicle profiles maintained in the database, a vehicle profile of the vehicle positioned within the region of interest based on executing a query using the generated second sequence of characters and transmitting, by the one or more processors, to a device, data included in the vehicle profile based on identifying the vehicle profile.

In some implementations, the method includes selecting, by the one or more processors, using a lookup table configured to relate characters of license plates with replacement characters for the license plates, one or more representative character pairs corresponding to the one or more characters of the first sequence and generating, by the one or more processors, the second sequence of characters, responsive to the selection. The lookup table can relate the one or more characters of the first sequence with the one or more corresponding replacement characters and the one or more representative character pairs include relate at least one of: a character "1" and a character "I", a character "2" and a character "Z", a character "5" and a character "S", a character "0" and a character "O", or a character "A" and a character "4". The method can include identifying, by the one or more processors, based on the vehicle profile, a service setting for the vehicle, generating, by the one or more processors, based on the service setting, a service to be provided to the vehicle, and providing, by the one or more processors, for display on a device, a prompt for the service to be provided. The method can include receiving, by the one or more processors, responsive to the prompt, an update to the service to be provided and storing, by the one or more processors, in the vehicle profile, the updated service as the service setting.

At least one aspect of the technical solutions is directed to a non-transitory computer-readable media. The non-transitory computer-readable media includes instructions that when executed by one or more processors, can cause the one or more processors to maintain, in a database, a plurality of vehicle profiles for a plurality of vehicles, each vehicle profile of the plurality of vehicle profiles including license plate information of a respective vehicle of the plurality of vehicles. The one or more processors can be caused to capture, via an image capture device, one or more images of at least a portion of a vehicle positioned within a region of interest of a service facility and identify, using the one or more images, a first sequence of characters of a license plate of the vehicle. The one or more processors can be caused to determine one or more characters of the first sequence of characters that satisfy a character replacement schema and generate a second sequence of characters by replacing the one or more characters that satisfy the character replacement schema with one or more corresponding replacement characters in the first sequence of characters. The one or more processors can be caused to identify, from the plurality of vehicle profiles maintained in the database, a vehicle profile of the vehicle positioned within the region of interest based on executing a query using the generated second sequence of characters and transmit, to a device, data included in the vehicle profile based on identifying the vehicle profile.

In some implementations, to transmit, to the device, data includes the one or more processors being configured to transmit, to a car wash controller, instructions to cause the car wash to provide a car wash type corresponding to the vehicle profile of the vehicle.

BRIEF DESCRIPTION OF THE DRAWINGS

FIGS. 7A-C are example screenshots of a user interface for automated vehicle recognition at service facilities.

DETAILED DESCRIPTION

Figure 1:
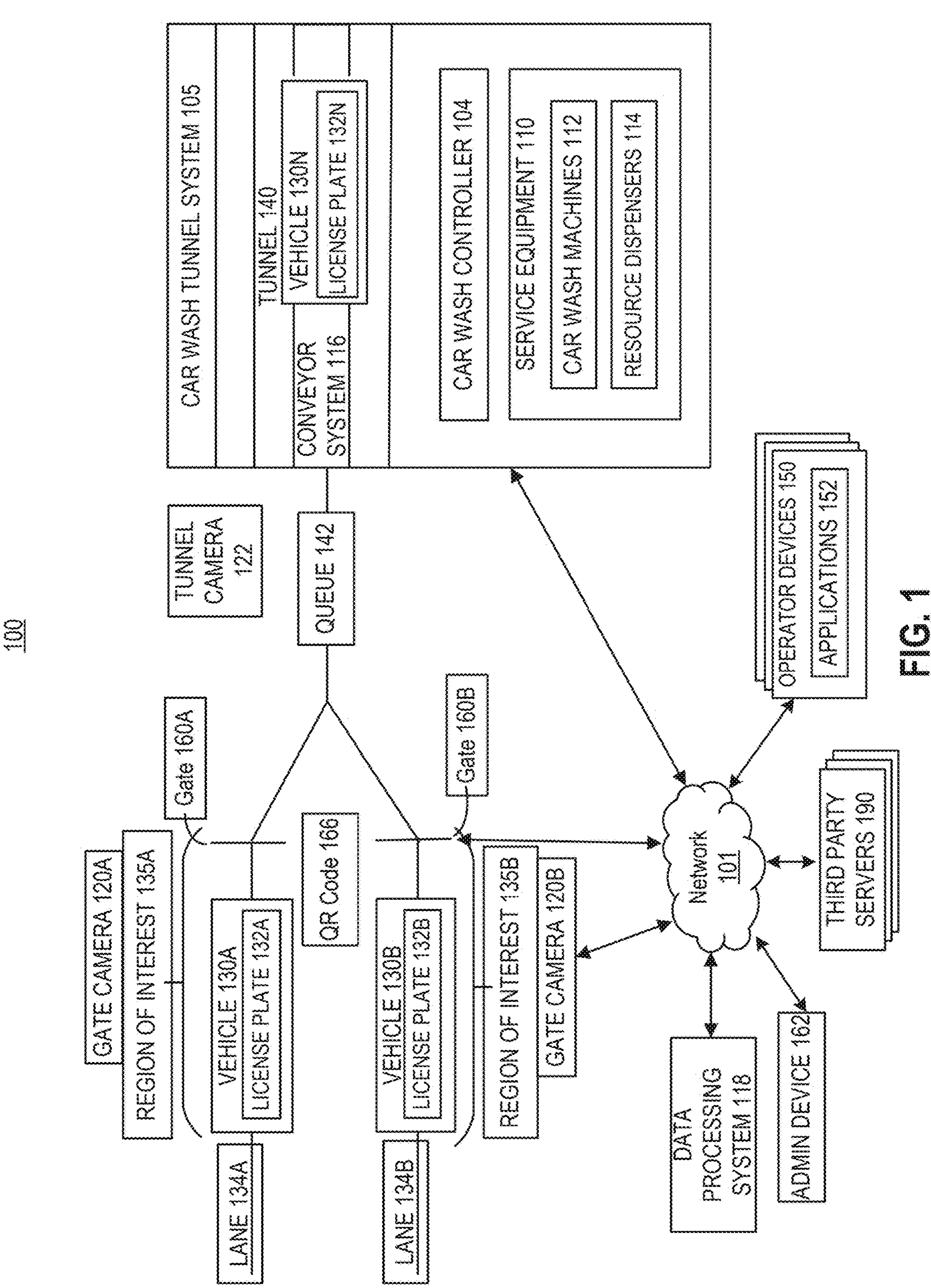
FIG. 1 is an example block diagram of a system for automated operation platform for a vehicle service facility.

For purposes of reading the description of the various implementations below, the following descriptions of the sections of the specification and their respective contents may be helpful:

Section A describes an overview of a service facility and its computing environment.

Section B describes systems and methods for automated vehicle recognition at service facilities.

Vehicle service facilities, particularly automated car wash facilities, can face numerous technical challenges in maintaining energy and time efficient and error-free operations. These challenges can include reliably identifying vehicles with pre-paid services when license plates are deformed (e.g., bent), stained, or obscured, leading to license plate misidentification that trigger service disruptions and waste of system energy and resources. Additionally, facilities can struggle with automatically controlling vehicle traffic flow based on vehicle types, queues, and traffic conditions, which can result in inefficient use of resources, longer wait times and waste of resources and energy. Automating service customization based on prior data or vehicle characteristics as well as implementing effective mobile device features for facility operators can be challenging to implement, yet beneficial to such facilities. These technical hurdles can impede the operation of automated vehicle service facilities and can cause reduced energy efficiency, increased errors, and diminished customer satisfaction.

To address these challenges, the technical solutions of this disclosure provide an automated platform that improves the reliability of operations of the facility at improved energy efficiency and customer satisfaction. The solutions can utilize image capture and recognition technology, which can include character image recognition or machine learning to accurately identify license plates even in challenging conditions. This improved recognition capability can reduce instances of vehicle misidentification, thus reducing down times and unnecessary gate actuation, thereby improving efficiency and conserving energy and other resources. The technical solutions can load balance and optimize vehicle flow based on traffic monitoring, reducing idle time and energy consumption of the vehicles waiting for their services. Furthermore, the technical solutions can automate service customization to identified vehicles facilitating allocation of exact resources to each individual vehicle, preventing wasteful overuse of water, soap, and electricity. The technical solutions can provide a mobile device application with features that can allow operators to improve their ability to monitor and control facility operations remotely, reducing the need for constant on-site presence and associated resource inefficiencies. As a result, the technical solutions allow for operating of a more energy-efficient, environmentally friendly, and cost-effective vehicle service facility, than was the case with vehicle service systems.

A. Overview of a Service Facility Computing Environment

The system of the technical solutions can include a computing environment having any combination of hardware and software for providing automated vehicle recognition at service facilities.

FIG. 1 illustrates an example block diagram of a facility 100, which can be referred to as a facility system or an environment, for providing a service to vehicles 130 or vehicle drivers. The facility 100 can include any combination of an indoor or outdoor area of a facility, space or a structure (e.g., a building) that can be configured or used as a location for deploying service systems, such as a car wash tunnel system 105 configured to provide services, such as car wash services, to vehicles 130 or their drivers. The facility 100 can include one or more outdoor areas that can include pathways or lanes 134 for directing or controlling the vehicles 130 arriving for service to be performed by the service system, such as the car wash tunnel system 105, at which the vehicle services are provided. The facility 100 can be, or include any type of a service facility, such as a car wash facility, a vehicle technical or a maintenance service facility (e.g., a system-based or automated oil change establishment), a fast food restaurant with a drive through for servicing drivers in the vehicles, an automated parking garage, a gas station, an event venue (e.g., a sports stadium) having vehicle parking centers, or any other facility managing or providing services involving vehicles or their drivers (e.g., drivers).

The facility 100 can include one or more of car wash tunnel systems 105 that can have one or more tunnels 140 with service equipment 110 configured to provide vehicle services, such as car washing, to various vehicles 130 passing through the tunnel 140. Each tunnel 140 can include one or more conveyor systems 116 over or onto which the vehicles 130 can be transported, passed or moved. For instance, a vehicle 130N identified by a license plate 132N can coupled or latched with the conveyor system 116 and moved, pushed or passed through the tunnel 140 as the service equipment 110 of the car wash tunnel system 105 provides automated car wash service. The car wash tunnel system 105 can include one or more car wash controllers 104 for controlling the one or more service equipment 110, which can include, for example, various car wash machines 112 and resource dispensers 114 for performing the automated car wash operations.

The facility 100 can include one or more lanes 134 for directing vehicle traffic towards the car wash tunnel system 105. For example, a facility 100 can include an external or outdoor space having a first lane 134A on which a first vehicle 130A identified by a first license plate 132A can move towards a first gate 160A. The facility 100 can include a second lane 134B on which a second vehicle 130B identified by a second license plate 132B can move towards a second gate 160B. The first lane 134A can include or encompass a first region of interest 135A that can be viewed, recorded or monitored by a first gate camera 120A capturing images or videos of the vehicle 130A as this vehicle approaches or passes the gate 160A controlling this vehicle's access to a queue 142 for entering tunnel 140 of the car wash tunnel system 105. Similarly, the lane 134B can include a second region of interest 135B that can be recorded or monitored by a second gate camera 120B capturing images or videos of the vehicle 130B as it approaches or passes the gate 160B controlling this vehicle's access to the queue 142.

The facility can include one or more quick response (QR) codes 166, which can be deployed at any location in the facility environment (e.g., along or adjacent to lanes 134, gates 160 or a structure housing a car wash tunnel system 105. A QR code 166 can include any two-dimensional barcode that can store or represent data such as URLs, text, or other types of information that can be read by a smartphone of a driver of the vehicle 130 or other QR code reader. When a user (e.g., a driver) takes a picture of the QR code 166 or otherwise captures the QR code with their mobile device, the QR code 166 can (e.g., include data) be used to cause the mobile device of the user to open an application or a webpage corresponding to the QR in which the user can select services to utilize, change their service type (e.g., monthly or annual subscription), and configure particular services (e.g., polishing of the vehicle, special type of washing service). The QR code 166 can be used to facilitate interaction between the user and the service provider, improving the user experience by providing an efficient way to access and manage services.

The gate cameras 120 and the gates 160 can be communicatively coupled with a data processing system 118, via one or more networks 101 of the facility system 100. The network 101 can communicatively couple and provide communication medium for one or more operator devices 150 executing applications 152, one or more third party servers 190 executing third party services (e.g., transaction operations) and one or more administrative devices 162 for providing administrative overview and services to the facility system 100. The network 101 can provide, enable, or otherwise facilitate the connections for communications between the data processing system 118 and gate cameras 120 to provide images or videos of the vehicles 130 and their license plates 132 to the data processing system to identify the service according to the entity profiles associated with the vehicles 130.

Facility 100 can include any combination of an indoor or outdoor area of a facility, space, or structure configured for deploying service systems, such as a car wash tunnel system 105. Facility 100 can be a car wash facility, a vehicle maintenance service facility, a fast food restaurant with a drive-through, an automated parking garage, a gas station, or an event venue with vehicle parking centers. Facility 100 can include pathways or lanes 134 for directing vehicles 130 arriving for service to be performed by the service system, such as car wash tunnel system 105. For instance, facility 100 can have outdoor areas with lanes 134 guiding vehicles 130 towards car wash tunnel system 105. Facility 100 can manage or provide services involving vehicles or their drivers, such as drivers. Facility 100 can include regions of interest 135 monitored by gate cameras 120 to capture images or videos of vehicles 130 as they approach or pass gates 160. Facility 100 can be communicatively coupled with data processing system 118, operator devices 150, third party servers 190, and admin devices 162 via network 101.

The facility 100 can include a building, a structure, or a service center at which vehicles 130 are cleaned, serviced, upgraded, or repaired or at which drivers of the vehicles receive services. The facility 100 can include, for example, exits and entrances, wash lanes, a wash tunnel, service bays, staffing, sensors, wash components, automated kiosks, among others to provide a service to a customer in the content of a washing, or any other, service. The facility 100 can include systems or processes, involving for example, service equipment 110 data processing systems 118, which can be overseen, managed, run, or otherwise controlled by operators, which can be authorized personnel, such as users of the operator devices 150 or admin device 162. The operators can include workers, technicians, managers, administrators, among other authorized personnel.

Car wash tunnel system 105 can include one or more tunnels 140 with service equipment 110 configured to provide vehicle services, such as car washing services. For example, car wash tunnel system 105 can have tunnels 140 with conveyor systems 116 over which vehicles 130 can be moved, guided or transported. Car wash tunnel system 105 can include car wash controllers 104 for controlling service equipment 110, which can include car wash machines 112 and resource dispensers 114. For instance, a vehicle 130 identified by a license plate 132 can be coupled with conveyor system 116 and moved through tunnel 140 as service equipment 110 provides automated car wash service. For instance, upon identifying a vehicle 130A, the car wash tunnel system 105 can be instructed to apply a particular set of car wash operations by the service equipment 110 in accordance with the settings or configurations for the account of the vehicle. Car wash tunnel system 105 can perform various automated car wash operations using car wash machines 112 and resource dispensers 114. Car wash tunnel system 105 can be deployed within a building or a structure at a facility 100, which can be accessed via lanes 134 and gates 160 controlling the flow of vehicles 130 to the tunnel 140. Car wash tunnel system 105 can be communicatively coupled with data processing system 118 to receive instructions for controlling service equipment 110.

Car wash controller 104 can include any combination of hardware and software for controlling service equipment 110 in car wash tunnel system 105. For example, car wash controller 104 can control car wash machines 112 and resource dispensers 114 to perform automated car wash operations. Car wash controller 104 can receive instructions from data processing system 118 to execute car wash routines based on vehicle features and license plate information. Car wash controller 104 can selectively control the deployment of car wash actuation components based on vehicle features identified from images captured by gate cameras 120 and tunnel cameras 122. For instance, car wash controller 104 can control the application of fluids or physical contact materials onto the vehicle during the car wash routine. Car wash controller 104 can be communicatively coupled with car wash tunnel system 105, data processing system 118, and other components of facility 100 via network 101. Car wash controller 104 can control the service equipment 110 to perform the car was services according to car was types designated or dedicated to the operator device. The car wash controller 104 can ensure that the car wash service is performed according to the service request generated by data processing system 118.

Service equipment 110 can include any combination of devices and machinery configured to provide vehicle services in car wash tunnel system 105. For example, service equipment 110 can include car wash machines 112, such as brush rollers, high pressure washers and drying blowers, as well as resource dispensers 114, such as soap and water dispensers, wax dispensers or tire shine dispensers, each of which can be utilized for performing automated car wash operations. Service equipment 110 can be controlled by car wash controller 104 to execute car wash routines based on vehicle features and license plate information. For instance, service equipment 110 can include brushes, sprayers, and dryers that clean and dry the vehicle as it passes through tunnel 140. Service equipment 110 can be configured to apply fluids or physical contact materials onto the vehicle during the car wash routine. Service equipment 110 can be part of car wash tunnel system 105 and can be accessed via lanes 134 and gates 160. Service equipment 110 can be communicatively coupled with car wash controller 104 and data processing system 118 to receive instructions for performing car wash operations.

Car wash machines 112 can include any combination of mechanical devices configured to perform automated car wash operations in car wash tunnel system 105. For example, car wash machines 112 can include automated machinery, such as brushes, rollers, and sprayers that clean the vehicle as the vehicle 130 passes through tunnel 140. Car wash machines 112 can include brush rollers, high-pressure washers, foam applicators, undercarriage washers, wheel cleaners, drying blowers, polishers, wax applicators and tire shiners. Car wash machines 112 can be arranged or deployed within or along the tunnel 140 to provide their designated operations or services to the vehicles 130 passing down the conveyor system 116. Car wash machines 112 can be controlled by car wash controller 104 to execute car wash routines based on vehicle features and license plate information. For instance, car wash machines 112 can apply soap, water, and wax to the vehicle during the car wash routine. Car wash machines 112 can be part of service equipment 110 and can be accessed via lanes 134 and gates 160. Car wash machines 112 can be configured to selectively control the application of fluids or physical contact materials onto the vehicle based on instructions from car wash controller 104. Car wash machines 112 can be communicatively coupled with car wash controller 104 and data processing system 118 to receive instructions for performing car wash operations.

Resource dispenser 114 can include any combination of devices configured to dispense resources, such as fluids, energy or materials, during the car wash routine in car wash tunnel system 105. For example, resource dispenser 114 can include automated dispensers of resources, including sprayers, nozzles, and dispensers that apply soap, water, and wax to the vehicle 130. Resource dispensers 114 can include dispensers for soap, water, wax, foam, tire shine, polish, spot-free rinse, conditioners, sealants, air, including heated air or any other resource used for vehicle service. Resource dispenser 114 can be controlled by car wash controller 104 to execute car wash routines based on vehicle features and license plate information. For instance, resource dispenser 114 can selectively control the application of fluids onto the vehicle during the car wash routine. Resource dispenser 114 can be part of service equipment 110 and can be accessed via lanes 134 and gates 160. Resource dispenser 114 can be configured to apply fluids or materials onto the vehicle based on instructions from car wash controller 104. Resource dispenser 114 can be communicatively coupled with car wash controller 104 and data processing system 118 to receive instructions for performing car wash operations.

Tunnel 140 can include any combination of structures and pathways configured to guide vehicles 130 through car wash tunnel system 105. The tunnel 140 can include a conveyor system 116 or a conveyor belt on which vehicles 130 can be moved, pushed or transported as the car washing is provided by the service equipment 110. Tunnel 140 can include any configurations or arrangements of service equipment 110, such as car wash machines 112 and resource dispensers 114, positioned to provide automated car wash services. For instance, a vehicle 130 identified by a license plate 132 can be coupled with conveyor system 116 and moved through tunnel 140 as service equipment 110 can provide automated car wash services to the vehicle. Tunnel 140 can be part of car wash tunnel system 105 and can be accessed via lanes 134 and gates 160. Tunnel 140 can be configured to guide vehicles 130 through the car wash process based on instructions from car wash controller 104. Tunnel 140 can be communicatively coupled with car wash controller 104 and data processing system 118 to receive instructions for performing car wash operations.

Conveyor system 116 can include any combination of structures and pathways configured to transport vehicles 130 through tunnel 140 in car wash tunnel system 105. The conveyor system 116 can include conveyor belts, tracks, or rollers that move vehicles 130 through tunnel 140. Conveyor system 116 can be controlled by car wash controller 104 to execute car wash routines based on vehicle features and license plate information. For instance, a vehicle 130 identified by a license plate 132 can be coupled with conveyor system 116 and moved through tunnel 140 as service equipment 110 provides car wash services. Conveyor system 116 can be part of tunnel 140 and can be accessed via lanes 134 and gates 160. Conveyor system 116 can be configured to transport vehicles 130 through the car wash process based on instructions from car wash controller 104. Conveyor system 116 can be controlled by a car wash controller 104 allowing vehicles 130 from the queue 142 to enter the tunnel 140. For instance, a conveyor system 116 can be communicatively coupled with a car wash controller 104 or a data processing system 118 to receive instructions to allow vehicles 130 to access or enter the tunnel 140 to receive the services by the car wash tunnel system 105. The conveyor system 116 can include or be coupled with one or more processors that can control one or more components of the conveyor system 116, such as a conveyor belt. The one or more processors can execute one or more instructions to cause the conveyor system 116 to move or propagate a vehicle 130 through the tunnel 140. The conveyor system 116 can include a ramp onto which a vehicle can be driven. The conveyor system 116 can include a conveyor belt mechanism pulling, guiding or moving a vehicle 130 in response to an instruction that the vehicle 130 is to be propagated through the tunnel 140. This can be done, for example, in response to updates to the queue of the car wash tunnel system 105.

Vehicle 130 can include any type of vehicle that can receive services at facility 100. For example, vehicle 130 can be a car, truck, van, or a motorcycle. Vehicle 130 can be identified by a license plate 132 and can be directed through lanes 134 towards car wash tunnel system 105. For instance, a vehicle 130 identified by a license plate 132 can be coupled with conveyor system 116 and moved through tunnel 140 as service equipment 110 provides car wash services. Vehicle 130 can be monitored by gate cameras 120 and tunnel cameras 122 to capture images or videos of the vehicle and its license plate 132. Vehicle 130 can be part of queue 142 and can receive car wash services based on instructions from car wash controller 104. Vehicle 130 can be communicatively coupled with data processing system 118 to receive services according to the entity profiles associated with the vehicle.

License plate 132 can include any plate having a combination of characters or symbols to identify a vehicle 130. For example, a license plate 132 can include alphanumeric characters that uniquely identify a vehicle 130 from a plurality of other vehicles 130. License plate 132 can be captured by gate cameras 120 and tunnel cameras 122 and its characters can be used for identifying the account or profile associated with the vehicle 130. The profile or account identified based on the characteristics of the license plate 132 can identify user information, vehicle information or for instance, a vehicle 130 identified by a license plate 132 can be coupled with conveyor system 116 and moved through tunnel 140 as service equipment 110 provides car wash services. License plate 132 can be used by data processing system 118 to identify the vehicle profile and generate a car wash service request. License plate 132 can be part of the vehicle profile stored in data processing system 118. License plate 132 can be used to determine the identity of the vehicle 130 based on images captured by gate cameras 120 and tunnel cameras 122.

Gate camera 120 can include any combination of hardware and software for capturing images or videos of vehicles 130 and their license plates 132. For example, gate camera 120 can be positioned at the entrance of facility 100 to capture images of vehicles 130 as they approach or pass gates 160. Gate camera 120 can be directed towards region of interest 135, such as a portion of a lane 134 or an area of the lane 134 before a gate 160 barring the vehicle 130 from accessing the car wash tunnel system 105. The gate camera 120 can include a license plate recognition (LPR) camera, including for example at or near a traffic lane 134, at or near a tunnel 140 to facilitate in recognizing license plates 132. Gate camera 120 can be used to identify vehicle features (e.g., colors, shapes, sizes, add-ons or other structures) of vehicles 130 approaching or entering facility 100 or the car wash tunnel system 105. For instance, gate camera 120 can capture images of a vehicle 130 identified by a license plate

132 and transmit the images to data processing system 118. The data processing system 118 can process the images and manage the camera. Gate camera 120 can be communicatively coupled with data processing system 118 to provide images or videos of vehicles 130 and their license plates 132. Gate camera 120 can be used to monitor regions of interest 135 and capture images of vehicles 130 as they enter or merge from various lanes 134 into a queue 142. Gate camera 120 can be coupled with the network 101 of facility system 100 and can provide images for identifying the service to the operator devices 150 according to the entity profiles associated with vehicles 130.

Tunnel camera 122 can include any combination of hardware and software for capturing images or videos of vehicles 130 and their license plates 132 at or near an entrance of a tunnel 140 or within the tunnel 140. For example, tunnel camera 122 can be positioned or directed to a region of interest 135 at an entrance of a tunnel 140 (e.g., at an entrance to the car wash tunnel system 105 building or a structure). The tunnel camera 122 can include a license plate recognition (LPR) camera, including for example at or near a traffic lane 134, at or near a tunnel 140 to facilitate in recognizing license plates 132. The tunnel camera 122 can be positioned inside tunnel 140 to capture images of vehicles 130 as they pass through car wash tunnel system 105. Tunnel camera 122 can be used to identify the license plate 132 and vehicle features of vehicles 130 receiving car wash services. For instance, tunnel camera 122 can capture images of a vehicle 130 identified by a license plate 132 and transmit the images to the data processing system 118. The data processing system 118 can process the images and manage the camera. Tunnel camera 122 can be communicatively coupled with data processing system 118 to provide images or videos of vehicles 130 and their license plates 132. Tunnel camera 122 can be used to monitor the vehicles 130 forming the queue 142 as well as observe the car wash process and capture images of vehicles 130 as they move into or through the tunnel 140. Tunnel camera 122 can be coupled with the network 101 of facility system 100 and can provide images for identifying the service according to the entity profiles associated with vehicles 130.

Queue 142 can include any order or arrangements of vehicles 130 in a line leading into the tunnel 140 of the car wash tunnel system 105. For example, queue 142 can include an order or arrangement of a plurality of vehicles, one following the other, as the vehicles are lined up to enter the tunnel 140. The vehicles 130 can arrive to the queue 142 from lanes 134, as managed or permitted to access by the gates 160 tunnel 140. Queue 142 can be controlled by a data processing system 118 via a car wash controller 104 to manage the entry of vehicles 130 to the tunnel 140 using control of the gates 160. For instance, a vehicle 130 identified by a license plate 132 can be permitted to proceed to the queue 142 by controlling the gate 160 to allow the vehicle 130 to access the queue 142. The data processing system 118 can maintain the queue 142 representation (e.g., vehicle order) using images from the cameras 120 or 122. The queue 142 can be monitored by both the gate cameras 120 and tunnel cameras 122 to keep track of any changes to the queue 142, using features for recognizing license plates 132. Queue 142 can be maintained and managed by the data processing system 118 to ensure that each vehicle receives its own designated service.

Lanes 134 can include any combination of pathways and structures configured to direct vehicle traffic towards car wash tunnel system 105. For example, lanes 134 can include outdoor areas with pathways guiding vehicles 130 towards gates 160 and tunnel 140. Lanes 134 can be used to manage the flow of vehicles 130 arriving for service at facility 100. For instance, lanes 134 can include a first lane 134A guiding a first vehicle 130A identified by a first license plate 132A towards a first gate 160A. Lanes 134 can include a second lane 134B guiding a second vehicle 130B identified by a second license plate 132B towards a second gate 160B. Lanes 134 can include regions of interest 135 monitored by gate cameras 120 to capture images or videos of vehicles 130 as they approach or pass gates 160. Lanes 134 can be part of facility 100 and can be accessed via pathways and outdoor areas. Lanes 134 can be communicatively coupled with data processing system 118 to manage the flow of vehicles 130 towards the car wash tunnel system 105. It should be appreciated that lanes can include any pathway on which vehicles can move and the lanes may not be defined using barriers or other physical structures or demarcations. It should also be understood that the lanes may not directly guide or direct the vehicles.

Gates 160 can include any combination of structures and mechanisms configured to control the access of vehicles 130 to queue 142 and tunnel 140 in car wash tunnel system 105. For example, gates 160 can include barriers, turnstiles, visible indicators/lights, or electronic gates that regulate the entry of vehicles 130. Gates 160 can be controlled by car wash controller 104 to manage the access of vehicles 130 based on vehicle features and license plate information. For instance, a vehicle 130 identified by a license plate 132 can be allowed to pass through gate 160 and enter queue 142 based on instructions from car wash controller 104. The instructions can be generated based on a successful processing of a transaction by the third party server 190 operating as a point of sale (POS) device for the facility 100. Gates 160 can be monitored by gate cameras 120 to capture images or videos of vehicles 130 as they approach or pass the gates. Gates 160 can be part of facility 100 and can be accessed via lanes 134 and pathways. Gates 160 can be communicatively coupled with data processing system 118 to control the access of vehicles 130 to queue 142 and tunnel 140 based on instructions from car wash controller 104.

Regions of interest 135 can include any areas and zones within facility 100 that are monitored or recorded by cameras, such as for capturing images or videos of vehicles 130. For example, regions of interest 135 can include areas near gates 160, lanes 134, and tunnel 140. Regions of interest 135 can be monitored by gate cameras 120 and tunnel cameras 122 to capture images or videos of vehicles 130 and their license plates 132. For instance, a region of interest 135A can be viewed by a gate camera 120A capturing images of a vehicle 130A identified by a license plate 132A as it approaches gate 160A. Regions of interest 135 can be used to identify vehicle features and license plate information for generating car wash service requests. Regions of interest 135 can be part of facility 100 and can be accessed via pathways and outdoor areas. Regions of interest 135 can be communicatively coupled with data processing system 118 to provide images or videos of vehicles 130 for identifying the service according to the entity profiles associated with the vehicles.

Data processing system 118 can include any combination of hardware and software for processing data and managing the operations of facility 100. Data processing system 118 can include one or more computing environments, servers, databases, and applications for storing and processing vehicle profiles, license plate information, and service requests. The data processing system 118 can be any computing device, collection of servers, data centers, among others, which include one or more processors coupled with memory storing instructions and data configured to implement or complete the tasks and processes described herein. The data processing system 118 can be electrically coupled to each of the components within the service facility 100 to control or monitor the reception and transmission of different data or signals within the service facility 100. The data processing system 118 can be deployed or provided within building or a structure housing the car wash tunnel system 105, or outside of it, such on a cloud based system, including a Software as a Service (SaaS). The data processing system 118 can be connected to the devices 150 via the network 101 (e.g., the internet or a Wi-Fi network).

Data processing system 118 can be used to identify vehicle features and generate car wash service requests based on images captured by gate cameras 120 and tunnel cameras 122. Data processing system 118 can receive images of a vehicle 130 identified by a license plate 132 and generate a car wash service request based on the vehicle profile. Data processing system 118 can be communicatively coupled with car wash controller 104, gate cameras 120, tunnel cameras 122, operator devices 150, third party servers 190, and admin devices 162 via network 101. Data processing system 118 can manage the operations of facility 100 by processing data and providing instructions for performing car wash operations, including sending instructions to car wash controller 104 to adjust, manage or operate various services equipment 110. Data processing system 118 can ensure that the car wash service is performed according to the service request generated based on the entity profiles associated with the vehicles 130.

Admin device 162 can include any combination of hardware and software for providing administrative overview and services to the facility system 100 or any of its components (e.g., data processing system 118, operator devices 150. For example, admin device 162 can include computers, tablets, or smartphones used by administrators to monitor and manage the operations of facility 100. Admin device 162 can be used to access data processing system 118, car wash controller 104, and other components of facility 100. For instance, admin device 162 can be used to view images or videos captured by gate cameras 120 and tunnel cameras 122, monitor the status of queue 142, and manage the flow of vehicles 130 through lanes 134 and gates 160. Admin device 162 can be communicatively coupled with data processing system 118, operator devices 150, and third party servers 190 via network 101. Admin device 162 can provide administrative services such as updating vehicle profiles, generating reports, and managing entity profiles. Admin device 162 can ensure that the operations of facility 100 are performed efficiently and according to the service requests generated based on the entity profiles associated with the vehicles 130.

Third party servers 190 can include any combination of hardware and software for executing third party services, such as transactions or POS operations for the facility system 100. For example, third party servers 190 can include servers, databases, and applications used by third party service providers to process transaction operations (e.g., exchange and validate credit card payment data of drivers of the vehicles), manage entity profiles, and provide additional services. Third party servers 190 can be used to execute transaction operations based on the service requests generated by data processing system 118. For instance, third party servers 190 can process payments for car wash services provided to vehicles 130 identified by license plates 132. Third party servers 190 can be communicatively coupled with data processing system 118, operator devices 150, and admin devices 162 via network 101. Third party servers 190 can provide additional services such as loyalty programs, promotions, and customer support. Third party servers 190 can ensure that the transaction operations and additional services are performed according to the service requests generated based on the entity profiles associated with the vehicles 130.

Operator devices 150 can include any combination of hardware and software used by operators of the facility 100 to interact with the facility system 100. Operator devices 150 can include smartphones, tablets, laptops, or desktop computers operated by users, such as employees or service providers of the facility 100. Operator devices 150 can execute applications 152 that allow users to access services provided by facility 100, including scheduling car wash services, providing attention to entity accounts of the drivers of the vehicles 130 or managing vehicle data or gate access at gates 160. For example, a user (e.g., an operator) can use a mobile application executing on an operator device 150 to access a graphical user interface to review the state of the lanes 134 or to schedule a car wash service for a vehicle 130 identified by a license plate 132. Operator devices 150 can be communicatively coupled with data processing system 118, car wash controller 104, and third party servers 190 (e.g., POS devices) via one or more networks 101. Operator devices 150 can receive and display data from data processing system 118 or gate cameras 120 and tunnel cameras 122, including images or videos of the vehicles at various lanes 134 and display this data to the user via a graphical user interface (GUI) of the operator device 150. Operator devices 150 can transmit data to data processing system 118, such as service requests or updates to entity accounts. Operator devices 150 can provide users with a convenient way to access and manage the services or vehicle data utilized at the facility 100.

Applications 152 can include any combination of software programs executed on operator devices 150 to provide users (e.g., operators or employees of the facility) with access to the services of facility system 100. For example, applications 152 can include mobile applications, web applications, or desktop applications. Applications 152 can provide graphical user interfaces (GUIs) that allow users to interact with the services provided by facility 100. For instance, a mobile application 152 can present a GUI that displays data objects representing vehicles 130 in different lanes 134, including images and license plate information of the vehicles 130. Applications 152 can allow users to schedule car wash services, manage client accounts, and view the status of their vehicles 130. Applications 152 can be communicatively coupled with data processing system 118, car wash controller 104, and third party servers 190 via network 101. Applications 152 can receive data from data processing system 118, such as service requests or updates to vehicle profiles, and display this data to the user. Applications 152 can provide a GUI to the user to generate or select instructions, such as an instruction to open a gate 160, or provide notifications, such as a notification that a particular vehicle 130 in a particular lane 134 is receiving assistance for a pending issue. Applications 152 can provide users with a user-friendly interface to access and manage the services provided by facility 100.

Network 101 can include any combination of wired and wireless network types and connections for facilitating communication within facility system 100. For example, network 101 can include wired connections such as Ethernet cables, fiber optic cables, and coaxial cables to provide high-speed and reliable data transmission between components like data processing system 118, car wash controller 104, and third party servers 190. Network 101 can include wireless connections such as Wi-Fi, Bluetooth, and cellular networks to enable flexible and convenient communication with operator devices 150 and admin devices 162. For instance, Wi-Fi can be used to connect gate cameras 120 and tunnel cameras 122 to data processing system 118, allowing for real-time transmission of images and videos of vehicles 130 and their license plates 132. Network 101 can support various network protocols and standards to ensure seamless integration and interoperability between different components of facility system 100. Additionally, network 101 can provide secure and encrypted communication channels to protect sensitive data and ensure the privacy of client accounts associated with vehicles 130. By incorporating both wired and wireless connections, network 101 can offer a robust and versatile infrastructure for managing the operations of facility 100.

Figure 2:
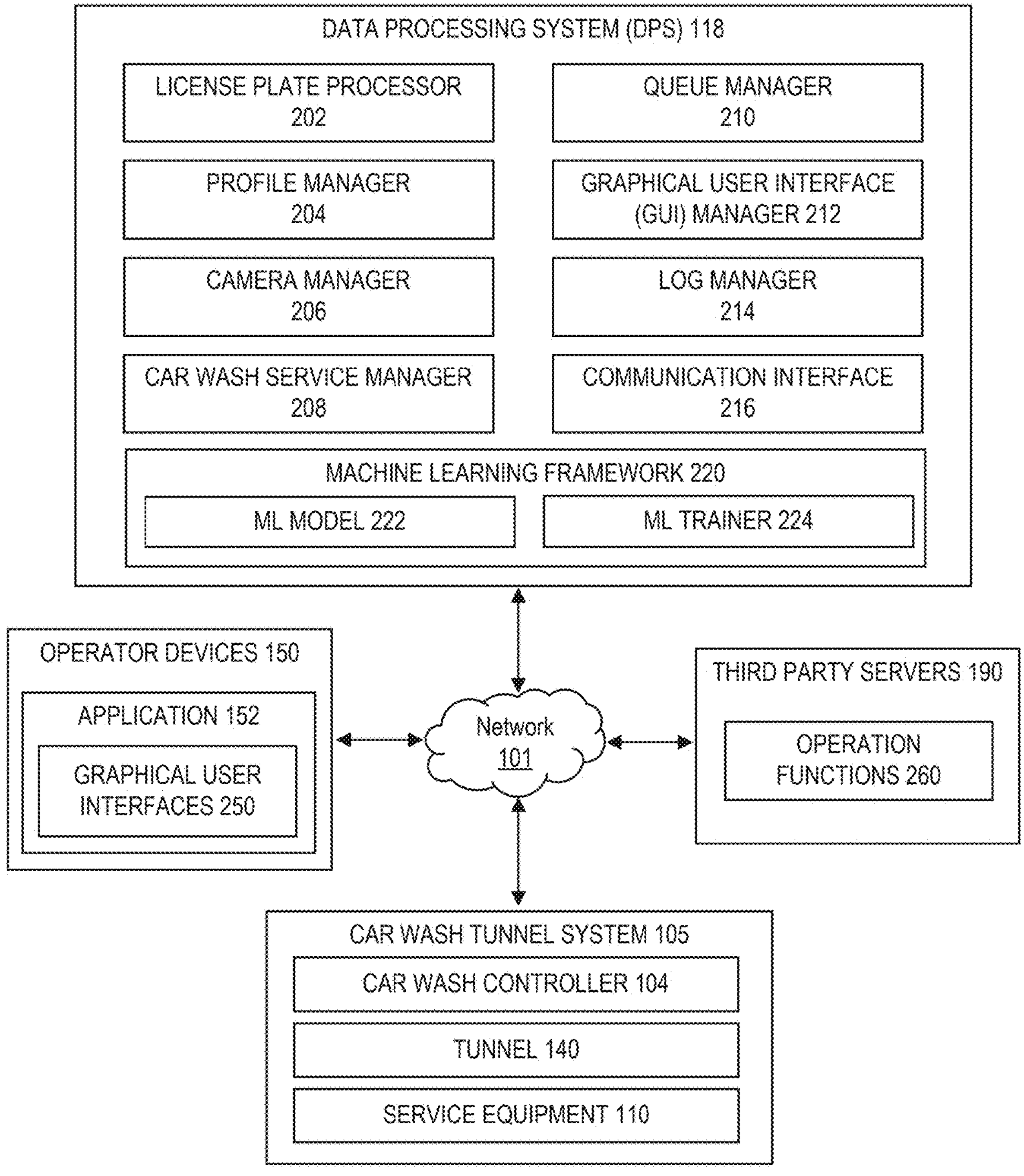
FIG. 2 is an example of a data processing system of the computing environment that can be used for implementing the technical solutions.

FIG. 2 illustrates an example system 200 for implementing the technical solutions of the facility system 100. The example system 200 can include a computing environment for implementing various functionalities of the technical solutions, such as automated vehicle license plate recognition, service facility queue adjustment based on a queue of a remote application, graphical user interface based management of vehicle lanes traffic at service facilities, or automated control of car wash services. The example system 200 can include one or more data processing systems 118, operator devices 150, third party servers 164 and car wash tunnel systems 105 that can be configured to communicate with each other via a network 101.

A data processing system 118 can include one or more of camera managers 206 to manage image capture devices, such as gate cameras 120 or tunnel cameras 122 to capture image or video data for processing by the data processing system. The data processing system 118 can include one or more of license plate processors 202 to apply image recognition to images captured by the cameras 120. A license plate processor 202 and a camera manager 206 can utilize machine learning to identify license plate characters or specific vehicle characteristics, as well as implement character replacement schema functionalities to utilize replacement characters to more reliably and efficiently identify license plates 132 for various vehicles 130.

The data processing system 118 can include one or more of profile managers 204 for managing profiles of vehicles or entities (e.g., data on vehicles and drivers), which can be used to facilitate automation of vehicle services customized for individual vehicles or drivers. The data processing system 118 can include one or more car wash service managers 208 for providing or managing car wash routines for different types of car wash services, based on the vehicle 130 (e.g., identified using a license plate processor 202) or entity profiles (e.g., data of the specific vehicle specifying car wash routines or preferences for the vehicle).

The data processing system 118 can include one or more queue managers 210 for monitoring or managing queues 142 (e.g., queues of the car wash tunnel system 105) to ensure that the designated vehicles 130 receive their intended and assigned services. A queue manager 210 can utilize machine learning and integrate with the license plate processor 202 and the camera manager 206 to track individual vehicles 130 at the facility and continuously update the vehicle queue to track the vehicles entering the tunnel 140 and maintain the order of their corresponding car wash routines.

The data processing system 118 can include one or more graphical user interface (GUI) managers 212 for managing graphical user interfaces (GUIs) 250 of the applications 152 executing on operator devices 150. The GUIs 250 can be configured to provide updated information on vehicles passing through the facility, including keeping track of vehicles 130 at the lanes 134 and facilitating timely and efficient management addressing of issues among the operators (e.g., facility staff) of the operator devices 150. The data processing system 118 can include one or more log managers 214 for generating and maintain logs or reports for the given services, as well as one or more communication interfaces 216 for facilitating interfacing or communication with other components of the system 200, such as via the network 101. The log manager 214 can log vehicle visits to the facility, maintain a series of videos or images of the vehicles 130 utilized during the visits and provide data on the vehicle over time. The data processing system 118 can include one or more machine learning (ML) frameworks 220 that can include one or more ML models 222 that can be trained by one or more ML trainers 224 to perform various tasks or operations of the data processing system components, such as for example license plate data recognition of a license plate processor 202 or vehicle identification for maintaining a queue of a queue manager 210.

An operator device 150 can be used by an operator (e.g., an employee of the facility) and execute one or more applications 152 having one or more GUIs 250 that can allow the operators to monitor the statuses of the lanes 134 or the vehicles 130 and timely address any pending issues. The issues may involve or relate to, for example, operation functions 260, such as POS transactions that can be executed via third party servers 164 (e.g., POS terminals) which the vehicle drivers may utilize to access or setup car wash services. The operation function 260 can include or provide operations for processing a credit card transaction or triggering a billing action of an account associated with the vehicle. The car wash tunnel system 105 can be controlled, managed, monitored or operated by the data processing system 118 or operator devices 150 to improve the system operation or facilitate the timely execution of operation functions 260.

ML framework 220 can include any combination of hardware and software for providing or implementing any type and form of ML or artificial intelligence (AI) functionalities of the data processing system. The ML framework 220 can manage and provide ML trainers 224 for training ML models 222 to perform functionalities of any of the components of the data processing system 118 (e.g., license plate processor 202, license plate data manager 426, camera manager 206, queue manager 210, or any other data processing system component or feature). For example, an ML framework 220 can utilize an ML trainer 224 to train an ML model 222 to detect, determine or identify license plate data or vehicle characteristics or features in order to identify vehicles. The ML trainers 224 can train the ML models 222 to detect updates in the order of vehicles in a queue entering a tunnel 140 of a car wash facility, thereby maintaining a correct representation of the order vehicles entering the car wash tunnel. ML models 222 can be trained to select or arrange one or more (e.g., a sequence of) car wash routines for implementing a particular (e.g., customized or desired) car wash service to the vehicle, based on the vehicle data or profile preferences.

The ML models 222 can include any combination of one or more neural networks, decision-making models, linear regression models, natural language models, random forests, classification models, generative AI models, reinforcement learning models, clustering models, neighbor models, decision trees, probabilistic models, classifier models, or other such models. For example, the models 222 include natural language processing (e.g., support vector machine (SVM), Bag of Words, Counter Vector, Word2Vec, k-nearest neighbors (KNN) classification, long short erm memory (LSTM)), object detection and image identification models (e.g., mask region-based convolutional neural network (R-CNN), CNN, single shot detector (SSD), deep learning CNN with Modified National Institute of Standards and Technology (MNIST), RNN based long short term memory (LSTM), Hidden Markov Models, You Only Look Once (YOLO), LayoutLM) (classification ad clustering models (e.g., random forest, XGBBoost, k-means clustering, DBScan, isolation forests, segmented regression, sum of subsets 0/1 Knapsack, Backtracking, Time series, transferable contextual bandit) or other models such as named entity recognition, term frequency-inverse document frequency (TF-IDF), stochastic gradient descent, Naïve Bayes Classifier, cosine similarity, multi-layer perceptron, sentence transformer, data parser, conditional random field model, Bidirectional Encoder Representations from Transformers (BERT), among others.

The ML models 222 can include generative AI models, also referred to as generative AI models 222, which can include any machine learning systems configured to create new content, such as text, images, or audio, by learning patterns from the data stored in a storage or a database (e.g., training datasets). The generative AI models 222 can be trained using techniques, such as supervised learning, unsupervised learning, and reinforcement learning. Generative AI models 222 can utilize data set from the stored data to create logical inferences between various complex structures in the data set to generate coherent outputs for prompts input into the models 222.

The ML models 222 implemented as generative AI models can include any machine learning (ML) or artificial intelligence (AI) model designed to generate content or new content, such as text, images, or code, by learning patterns and structures from existing data. Such ML model 222 (e.g., a generative AI models) can include any model, a computational system or an algorithm that can learn patterns from data (e.g., chunks of data from various input images, videos, documents, computer code, templates, forms, etc.) and make predictions or perform tasks without being explicitly programmed to perform such tasks. The generative AI model 222 can include, utilize or refer to a large language model. The generative AI model 222 can be trained using a dataset of documents (e.g., text, images, videos, audio or other data). The generative AI model 222 can be designed to understand and extract relevant information from the dataset. The generative AI model 222 can leverage natural language processing techniques and pattern recognition to comprehend the context and intent of a prompt (e.g., one or more instructions), which can be used as input into the ML model 222 to trigger the desired output or result.

The ML model 222, including for example a generative AI model, can be designed, constructed, utilize or include a transformer architecture with one or more of a self-attention mechanism (e.g., allowing the model to weigh the importance of different words or tokens in a sentence when encoding a word at a particular position), positional encoding, encoder and decoder (multiple layers containing multi-head self-attention mechanisms and feedforward neural networks). For example, each layer in the encoder and decoder can include a fully connected feed-forward network, applied independently to each position. The data processing system 118 can apply layer normalization to the output of the attention and feed-forward sub-layers to stabilize and improve the speed with which the generative AI model 222 is trained. The data processing system 118 can leverage any residual connections to facilitate preserving gradients during backpropagation, thereby aiding in the training of the deep networks. Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer, ML trainers 224 can include any combination of hardware and software for training ML models 222. ML trainers 224 can use datasets including images, videos, documents or character strings to identify, detect or monitor license plate data, vehicle data, user data, vehicle queues or any other set of information handled by the data processing system 118. Through training, a generative ML model 222, also referred to as a generative AI model 222, can learn or adjust its understanding of mapping embeddings to particular issues (e.g., vehicle features or characteristics identified via images), by adjusting its internal parameters. For example, the model 222 can be trained using datasets comprising vehicle or license plate data. The internal parameters can include numerical values of a generative AI model that the model learns and adjusts during training to optimize its performance and make more accurate predictions. Such training and can include iteratively presenting the various data chunks or documents of the dataset (e.g., or their chunks, embeddings) to the generative AI model 222, comparing its predictions with the known correct answers, and updating the model's parameters to minimize the prediction errors. By learning from the embeddings of the dataset data chunks, the generative AI model 222 can gain the ability to generalize its knowledge and make accurate predictions or provide relevant insights when presented with prompts.

Figure 3:
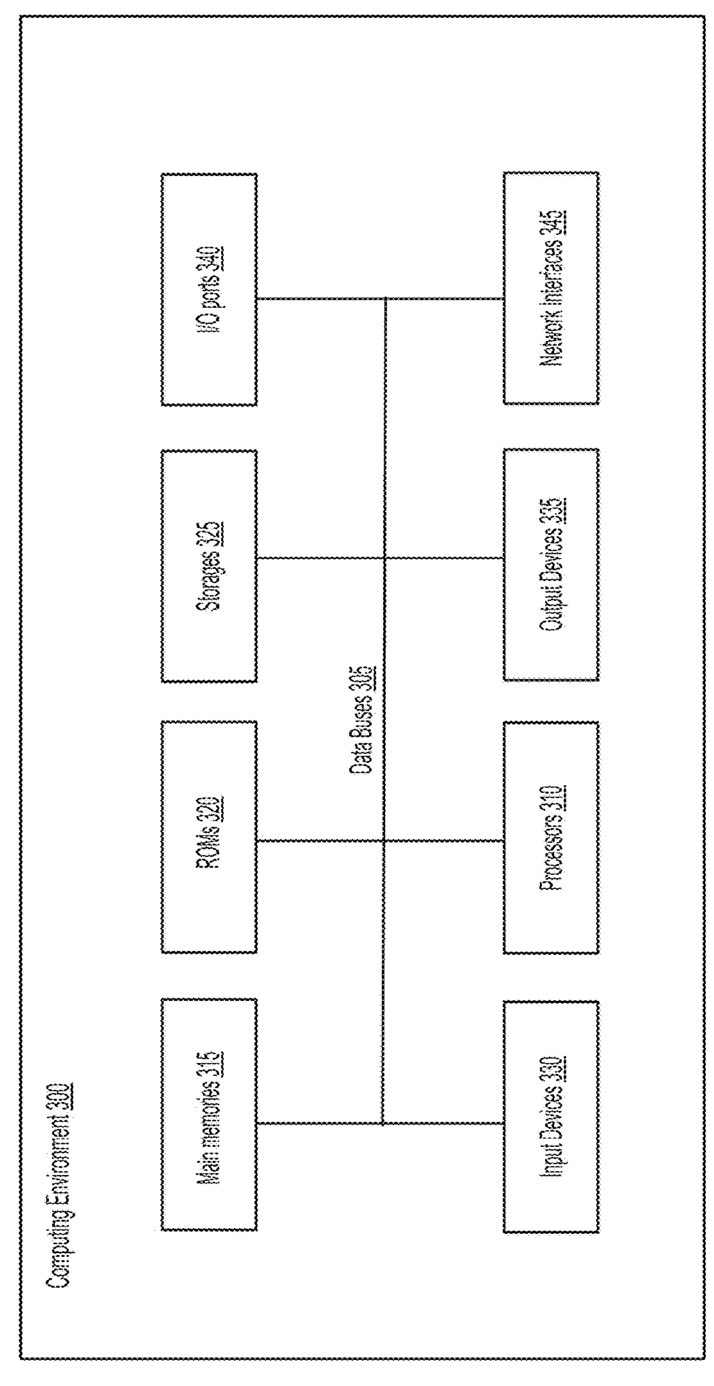
FIG. 3 is an example block diagram of a computing environment in which the data processing system and the features of the technical solutions can be implemented.

FIG. 3 illustrates an example block diagram of a computing environment 300, also referred to as a computing or a computer system 300, using which any of the computational components of the example system 200 can be implemented. For instance, the computing environment 300 can be utilized to implement or execute any portion of a data processing system 118, an operator device 150, a third party server 190 or a car wash tunnel system 105. Computer system 300 can include or be used to implement any computation or processing (e.g., operation, command, protocol, or data processing) described herein, including any component of a data processing system 118. For instance, instructions, computer code or data stored in memories of the computing system 300 (e.g., 315, 320 or 325) can be utilized to configure processors of the computing system (e.g., 310) to execute any of the functionalities of the data processing system 118 described herein.

Computing system 300 can include at least one bus data bus 305 or other communication component for communicating information and at least one processor 310 or processing circuit coupled to the data bus 305 for processing information. Computing system 300 can include one or more processors 310 or processing circuits coupled to the data bus 305 for exchanging or processing data or information. The processors 310 can include any processing circuitry, including, for example, graphics processing units (GPUs) or any circuitry or processors configured for executing machine learning or artificial intelligence models. Computing system 300 can include one or more main memories 315, such as a random-access memory (RAM), dynamic RAM (DRAM) or other dynamic storage device, which can be coupled to the data bus 305 for storing information and instructions to be executed by the processor(s) 310. Main memory 315 can be used for storing information (e.g., data, computer code, commands, or instructions) during execution of instructions by the processor(s) 310.

Computing system 300 can include one or more read only memories (ROMs) 320 or other static storage device coupled to the bus 305 for storing static information and instructions for the processor(s) 310. Storage 325 can include any storage device, such as a solid-state device, magnetic disk, or optical disk, which can be coupled to the data bus 305 to persistently store information and instructions. Storage 325 can be used, for example, to provide data repositories.

Computing system 300 can be coupled via the data bus 305 to one or more output devices 335, such as speakers or displays (e.g., liquid crystal display or active-matrix display) for displaying or providing information to a user. Input devices 330, such as keyboards, touch screens or voice interfaces, can be coupled to the data bus 305 for communicating information and commands to the processor(s) 310. Input device 330 can include, for example, a touch screen display (e.g., output device 335). Input device 330 can include a cursor control, such as a mouse, a trackball, or cursor direction keys, for communicating direction information and command selections to the processor(s) 310 for controlling cursor movement on a display.

Computer system 300 can include input/output ports 340, also referred to as I/O ports 340, can include physical interfaces that facilitate or provide communication between external or peripheral devices and processor(s) 310 and/or memory 315. I/O ports 340 can be connected to data bus 305, allowing the transfer of data between the processor(s) 310, memories 315, and any external devices (e.g., keyboards, mice, printers, and external storage devices). Computer system 300 can include one or more network interfaces 345 coupled via data buses 305. Network interfaces 345 can include any physical or virtual components enabling communication between the computer system 300 and any external networks (e.g., the Internet). Network interface 345 can provide transfer of data between the processor(s) 310, memories 315 and any external networks.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors 310 in a multi-processing arrangement can be employed to execute the instructions contained in main memory 315. Hard-wired circuitry can be used in place of or in combination with software instructions together with the systems and methods described herein. describes systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

B. Systems and Methods for Rapid License Plate Reading Via Character Substitution When a vehicle 130 enters a region of interest 135 within a proximity of a gate 160, the technical solutions can utilize a gate camera 120 to capture one or more images or video streams of the vehicle. Once captured, the image data processing system can analyze this visual data to identify a portion of the vehicle 130 that includes identifiers, such as a license plate 132 or a vehicle identification number (VIN). For instance, upon identification of the identifiers, the data processing system 118 can implement a character recognition functionality to identify the characters within a license plate. Sometimes, the vehicle can be muddy, wet, dusty or include scratches, bends or various other obstructions that make it challenging for the to recognize the characters of the license plate. In such instances, the data processing system can mistakenly identify a character "0" as a character "O", a character "5" as a character "S", a character "1" as a character "I', or a character "A" as a character "4".

To overcome such challenges, the technical solutions of this disclosure can encode the license plate data to substitute or replace the characters that are prone to misreading by characters for which the likelihood of error or misidentification is reduced, thereby improving the reliability of the vehicle identification. In particular, the technical solutions can provide a license plate processor that can identify the characters of a detected license plate data that satisfy a character replacement schema. Based on the character replacement schema, the technical solutions can generate a replacement license plate data in which replacement characters are substituted or inserted instead of the characters triggering or satisfying the character replacement schema (e.g., characters that can be confused with other characters and should be replaced into a uniform format). The replacement license plate data can then be stored and used for more reliably recognizing the vehicle based on the images of the license plate when the license plate or the vehicle is subjected to non-ideal conditions or weather elements.

Figure 4:
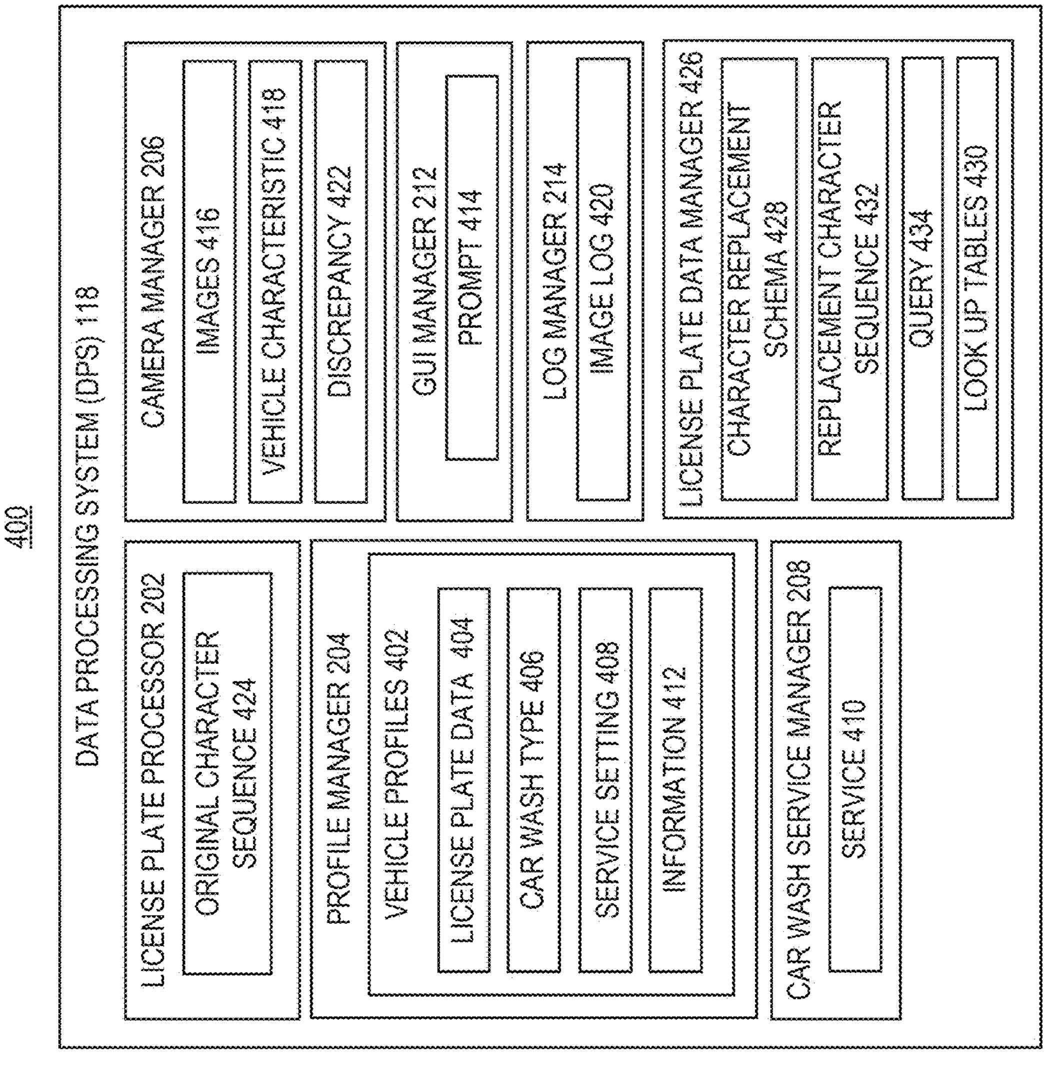
FIG. 4 is an example block diagram of a system for automated vehicle recognition at service facilities.

FIG. 4 illustrates an example system 400 for implementing the technical solutions of the facility system 100. The example system 400 can include a computing environment for a system to implement automated vehicle license plate recognition for use at service facilities, such as a car wash facility. The example system 400 include one or more data processing systems 118, which can be integrated using any combination of one or more instances of the system 200 of FIG. 2 or the system 300 of FIG. 3, in the context of a facility 100 of FIG. 1. The data processing systems 118 can include one or more of the ML models 222 to perform operations of the data processing system 118, such as vehicle license plate data processing by license plate processor 202 or vehicle identification via camera managers 206.

The data processing system 118 can include one or more license plate processors 202 for capturing and processing original character sequences 424 of vehicle license plates 132. The data processing system 118 can include one or more profile managers 204 which can include one or more databases storing one or more vehicle profiles 402 for one or more vehicles 130. Each vehicle profile 402 can include various vehicle data, such as one or more of license plate data 404 (e.g., license plate information, license plate number), car wash type 406 (e.g., types of car wash services to apply to the vehicle), service settings 408 (e.g., settings for the vehicle services to apply to the vehicle), or various information 412 (e.g., any additional information on the vehicle). The data processing system 118 can include one or more of car wash service managers 208 providing services 410 to the vehicle. The data processing system 118 can include one or more camera managers 206 communicatively coupled to at least the one or more gate cameras 120. The camera manager 206 can capture and determine one or more images 416 (e.g., images of the vehicle 130), one or more vehicle characteristics 418 (e.g., features of the vehicle), and one or more discrepancies (e.g., differences between images and prior captures images of the vehicle). The data processing system 118 can include one or more car wash service managers 208 which can include one or more services 410 (e.g., services provided to the vehicle) to execute. The data processing system 118 can include one or more GUI managers 212 which can generate one or more prompts 414 (e.g., to be provided for display on a device). The data processing system 118 can include one or more log managers 214 which can store one or more image logs 420 (e.g., storing images provided by the camera manager 206). The data processing system 118 can include one or more license plate data managers 426 using at least one of a character replacement schema 428 and a lookup table 430 to generate one or more replacement character sequences 432 from the original character sequences 424. The license plate data manager 426 can execute queries 434 (e.g., code, questions) to determine a vehicle profile.

The license plate processor 202 can individually, or in conjunction with a license plate data manager 426, process and determine the original character sequence 424 and identify its corresponding replacement character sequence 432. Original character sequence 424 can be any sequence of characters (e.g., numerical, alphabetical) on a license plate (e.g., license plate 132) of the vehicle 130. The original character sequence 424 can refer to a license plate number on the license plate 132 of the vehicle 130, and can be correlated to the license plate data 404. The license plate processor 202 can receive the images 416 from the camera manager 206 and determine the original character sequence 424 from the images 416. For example, the license plate processor 202 can include at least one ML model 222 including one or more character recognition models, algorithms, or software, such as optical character recognition (OCR) to determine the original character sequence 424 from the images 416. The license plate processor 202 can input the images 416 into a ML model 222, and the ML model 222 can output the original character sequence 424 or provide the corresponding replacement character sequences 432.

The profile manager 204 can store and provide various vehicle profiles 402. A vehicle profile 402 can include various vehicle data. For example, the vehicle profile 402 can include license plate data 404 of a respective vehicle 130 of the plurality of vehicles 130. The license plate data 404 can include at least one of a license plate number, jurisdiction information (e.g., state, province, country), or registration (e.g., tag, sticker, date) of the vehicle 130.

Each of the vehicle profiles 402 maintained by the profile manager 204 can include the car wash type 406. For example, the car wash type 406 refers to a type of wash to be performed on the vehicle 130 associated with the vehicle profile 402. The car wash type 406 can be set by at least one of the operator, the driver, or determined based on a type of the vehicle 130 (e.g., car, truck, van, or a motorcycle). For example, the profile manager 204 can select and set the car wash type 406 for the vehicle profile 402 based on the type of the vehicle 130, which can be stored in the vehicle profile 402. The car wash type 406 can include at least one of "Express wash," "Platinum wash," "Silver wash," etc. For example, the car wash type 406 includes multiple levels of car washes including express wash, platinum wash, and silver wash. Each level of the car wash type 406 can include a different type or number of services. For example, the platinum wash can include wheel polish, an underbody rinse, and a wax service while the express service includes a cleansing foam and a rinse.

Each of the vehicle profiles 402 can include the service setting 408 for each of the vehicles 130. The service setting 408 can include and/or indicate a service 410 to be provided to the vehicle 130. The service 410 can correspond to the car wash type 406. For example, the service setting 408 includes an indication of the service 410 to be provided to the vehicle 130, and the service 410 can include express wash, platinum wash, or silver wash. The service setting 408 can include, for example, a type of soap for the service 410 to use depending on a type of paint or coating of the vehicle 130, which can be indicated in the vehicle profile 402. The service setting 408 can include other parameters related to the service 410, such as a temperature of water, which of the service equipment 110 to use, etc.

Each of the vehicle profiles 402 can include information 412 associated with each of the vehicles 130. The information 412 can include various additional information of each of the vehicles 130. For example, the information 412 can include, but not limited to, the vehicle 130 type (e.g., car, truck, van, motorcycle) the vehicle 130 model (e.g., manufacturer design), type of wheel on the vehicle 130, number of car washes performed on the vehicle 130, etc. In some implementations, the information 412 includes the car wash type 406, the service setting 408, and/or the service 410. In some implementations, the information 412 includes information related to a driver or owner of the vehicle 130, such as name and payment information. The information 412 can indicate a membership to the service facility 100 of the vehicle 130. For example, the vehicles 130 corresponding to the vehicle profiles 130 can have prepaid for a certain amount of services from the service facility 100.

The camera manager 206 can capture and store various images 416. The camera manager 206 is communicatively coupled to an image capture device (e.g., gate cameras 120), and can capture one or more images 416 of at least a portion of a vehicle 130 positioned within a region of interest (e.g., regions of interest 135) of a service facility (e.g., service facility 100). The camera manager 206 can monitor the region of interest 135, and transmit instructions to the image capture devices to capture the images 416 of the vehicle 130. The camera manager 206 can then receive and store the images 416. For example, the camera manager 206 includes a database (e.g., log) in which the images 416 are stored. In other implementations, the camera manager 206 provides the images 416 to the log manager 214 to store in the image log 420.

Based on the images 416, the camera manager 206 can identify a vehicle characteristic 418 (e.g., characteristic of a vehicle 130). The camera manager 206 can include the ML models 222 to determine the vehicle characteristic 418. For example, the ML model 222 can be an image recognition model configured or trained to recognize vehicles from images 416. For instance, the camera manager 206 can input the images 416 into the ML model 222, and the ML model 222 can output the vehicle characteristic 418. The vehicle characteristic 418 can include features of the vehicle 130. For example, the vehicle characteristic 418 can include, but not limited to, a width, length, height of the vehicle 130 as well as features, such as whether the vehicle 130 includes a trunk bed, a rack on the roof, etc. The vehicle characteristic 418 can include a color of the vehicle 130, such as black, white, gray, etc. To identify the vehicle characteristic 418, the camera manager 206 can include or utilize at least one ML model 222 (e.g., an image recognition model, algorithm, or software) trained to recognize vehicle characteristics. For example, the camera manager 206 can include at least one machine learning model to receive the images 416 as an input, and provide as output, one or more the vehicle characteristic 418 to identify or track the vehicle.

The license plate data manager 426 can process license plate data, including the sequences of characters of license plates to identify or recognize a vehicle. For example, the license plate data manager 426 can receive and process character sequences of a license plate, and can encode, substitute or replace characters of the character sequence which can be prone to misreading or error. To do so, the license plate data manager 426 includes a character replacement schema 428 (e.g., rules, guidelines for substitution of characters prone to misreading or misidentification). The character replacement schema 428 can indicate to the license plate data manager 426 which characters of a character sequence to replace and which to keep (e.g., maintain).

Following identification of the original character sequence 424, the license plate processor 202 can provide the original character sequence 424 to the license plate data manager 426. The license plate data manager 426 can determine one or more characters of the original character sequence 424 that satisfy the character replacement schema 428. The license plate data manager 426 can include a lookup table 430 that maps original characters of the license plates with replacement characters of a replacement schema 428. For instance, the character replacement schema 428 can utilize a lookup table 430 that relates each of the characters to be substituted or replaced with their corresponding replacement characters. The lookup table 430 can include a selection of characters of various license plates 132 that correspond to or relate to their corresponding replacement characters. For example, the lookup table 430 relates the one or more characters of the original character sequence 424 with one or more corresponding replacement characters that can be used as substitution for the original characters of the license plate. The one or more characters and one or more corresponding replacement characters can be referred to as one or more representative character pairs that can be mapped in the lookup table 430. For instance, the one or more representative character pairs can relate at least one of a character "1" and (e.g., with) a character "I", a character "2" and a character "Z", a character "5" and a character "S", a character "0" and a character "O", or a character "A" and a character "4." In some embodiments, the vehicle profile can store both the vehicle license plate data with the replacement characters and the vehicle license plate data using the original characters (e.g., prior to their replacement).

Using the lookup table 430, the license plate data manager 426 can determine whether one or more characters of the license plate satisfy a character replacement schema (e.g., include one or more original characters that correspond to one or more replacement characters). For instance, the license plate data manager 426 can check whether any of the characters of the license plate have a corresponding replacement character. The license plate data manager 426 can map the one or more characters of the original character sequence 424 with the one or more of the corresponding replacement characters. The characters of the license plate that satisfy a character replacement schema can have one or more corresponding replacement characters in the lookup table 430 for replacing the one or more characters of the original character sequence 424. The license plate data manager 426 can identify, match, or select, based on the mapping, the one or more replacement characters that correspond to the characters of the original character sequence 424 satisfying the replacement schema. For example, the license plate data manager 426 can determine that an original character sequence 424 of a license plate includes a character "2" and a character "0" that satisfy the character replacement schema (e.g., correspond to replacement characters). Responsive to determining that the original character sequence 424 includes characters with corresponding replacement characters (e.g., characters included in the lookup table 430), the license plate data manager 426 determines that the one or more characters of the original character sequence 424 satisfies the character replacement schema 428.

Upon determining that the one or more characters of the original character sequence 424 satisfy the character replacement schema 428, the license plate data manager 426 generates a replacement character sequence 432 (e.g., second sequence of characters). The license plate data manager 426 generates the replacement character sequence 432 by replacing the one or more characters of the original character sequence 424 that satisfy the character replacement schema 428 with the one or more corresponding replacement characters based at least partially on the lookup table 430. For example, the license plate data manager 426 can select the one or more representative character pairs corresponding to the one or more characters of the original character sequence 424 using the lookup table 430.

For example, the license plate data manager 426 can process, encode, substitute or replace characters using the ML model 222. The license plate data manager 426 can input the original character sequence 424, and the ML model 222 can generate the replacement character sequence 432. The ML model 222 can be trained to use, for example, the character replacement schema 428 to generate the replacement character sequence 432 based on the original character sequence 424 used as input, or based on images of the license plate used as input (e.g., implementing optical character recognition in the process).

After selecting the representative character pairs, the license plate data manager 426 generates the replacement character sequence 432. The license plate data manager 426 uses the representative character pairs to replace characters of the original character sequence 424 with replacement characters. For example, responsive to determining that the original character sequence 424 includes a "5" and an "A," the license plate data manager 426 selects the representative character pairs "5" and "S" and "A" and "4." The license plate data manager 426 then generates the replacement character sequence 432 by replacing "5" with "S" and "A" and "4" in the original character sequence 424. The replacement character sequence 432 is thus the original character sequence 424 with one or more replaced characters according to the character replacement schema 428.

The license plate data manager 426 can include a query 434 (e.g., question, instruction). The license plate data manager 426 can execute the query 434 using the replacement character sequence 432 and identify, from the vehicle profiles 402 maintained in the profile manager 204, a vehicle profile 402 of the vehicle 130 positioned within the region of interest 135. For example, the query 434 includes the replacement character sequence 432, and the license plate data manager 426 executes the query 434 by transmitting the query 434 to the profile manager 204. The license plate data manager 426 can then identify the vehicle profile 402 of the vehicle 130 positioned within the region of interest 135 by at least one of receiving the vehicle profiles 402 from the profile manager 204 or the profile manager 204 can use the query 434 to identify the vehicle profile 402 associated with the vehicle 130 in the region of interest 135. At least one of the profile manager 204 or the license plate data manager 426 can use the lookup table of the character replacement schema 428 to match (e.g., correspond) the replacement character sequence 432 to the encoded license plate sequence in the respective vehicle profile 402. For instance, a vehicle profile 402 can be identified or accessed based at least partially on a match between the replacement characters and the license plate data 404 stored in the vehicle profile 402. At least one of the profile manager 204 or the license plate data manager 426 can compare the license plate data 404 stored in the vehicle profiles 402 to the replacement character sequence 432 to identify or authenticate a vehicle profile 402 of a vehicle 130, responsive to the query 434.

The license plate data manager 426 can utilize character replacement schema 428 to detect a change of a vehicle license plate 132 on a vehicle 130. For example, a license plate data manager 426 can apply a character replacement schema 428 and information stored in vehicle profiles 402 (e.g., vehicle make, model, color or images) to identify, detect or determine that a vehicle 130 has changed a license plate 132. For instance, the license plate data manager 426 can utilize an image of a vehicle license plate from an image log 420 to identify a string of characters on the license plate. Using one or more rules of the character replacement schema 428, the license plate data manager 426 can determine (e.g., via a look up table 430) that one or more of the characters from the image have one or more corresponding replacement characters. The license plate data manager 426 can, in response to this determination, generate a replacement character sequence 432 replacing those characters that are subject to the character replacement schema 428. The license plate data manager 426 can then utilize the replacement character sequence 432 to identify or select a vehicle profile 402 corresponding to the license plate data 404 storing the matching replacement character sequence 432.

To detect the change of the vehicle license plate, the profile manager 204 can utilize information 412 from the vehicle profile 402 that is identified or selected using the replacement character sequence 432. For instance, using a current image of the vehicle, the data processing system 118 can extract characteristics of the vehicle, such as the vehicle make and model, type of vehicle (e.g., sedan, sport utility vehicle or a truck) or a color of the vehicle to make a comparison between the vehicle having the replacement character sequence 432 and the characteristics of that vehicle stored in the vehicle profile 402.

For instance, the profile manager 204 and the license plate data manager 426 can determine that the replacement character sequence 432, while matching the license plate data 404, does not match one or more information 412 on the vehicle. For instance, the replacement character sequence 432 can match the license plate data 404 (e.g., storing the same replacement character sequence), but the information 412 may be not matching the characteristics of the vehicle from the image captured. For instance, the image of the vehicle with the replacement character sequence 432 may have a different color, a different make or model type, or a different configuration than the vehicle described in the information 412 of the vehicle profile 204. In response to the vehicle having the license plate with a matching replacement character sequence 432 having characteristics (e.g., color, type, make and mode) that do not match the characteristics of the vehicle in the information 412, the profile manager 204 or the license plate data manager 426 can determine that the license plate was swapped or replaced onto a different vehicle.

The license plate data manager 426 can utilize the replacement characteristic sequence 432 to identify or validate the vehicle entering the facility 100. For instance, the license plate data manager 426 can utilize the character replacement schema 428 and the corresponding replacement characters to identify the vehicles 130 and identify or select their vehicle profiles 402. Upon generating a replacement character sequence 432, the license plate data manager 426 can send the replacement character sequence 432 to the profile manager 204 to identify a vehicle profile 402 having a matching replacement character sequence 432 in the license plate data 404. In response to identifying the match between the replacement character sequence 432 and the license plate data 404, the profile manager 204 can validate the vehicle 130 and provide any requested access to the vehicle profile 402 (e.g., to access the car wash type 406, service setting 408 or information 412). In some instances, in response to validating the identity of the vehicle, the profile manager 204 can prepopulate the service settings 408, such as by selecting the most desired service for the vehicle, the most commonly selected service for the vehicle or the most recently selected service that the vehicle user had selected during a preceding visit. Prepopulating the vehicle service order can include selecting specific service settings 408 for the system to provide a desired type of car wash, type of soap or selection of shine to the vehicle.

The license plate data manager 426 can match the replacement character sequences 432 of the license plates with the vehicle characteristics (e.g., color, vehicle type and make and model) of the vehicle profile 402 to validate vehicles entering the facility. For example, the license plate data manager 426 and the profile manager 204 can compare the replacement character sequence 432 with the license plate data 404 to identify a match. The camera manager 206 can also utilize machine learning to identify vehicle characteristics which the data processing system can compare with the characteristics of the vehicle stored in the profile manager 204. Upon determining that the vehicle characteristics determined from the current image match those stored in the vehicle profile 402 and also determining that the replacement character sequence 432 matches the stored license plate data 404, the data processing system 118 can validate or confirm that the vehicle 130 is the vehicle of the vehicle profile 402. Responsive to the validation, the system can apply specific actions, such as prepopulating the car wash type 406 or automating the service settings 408 for the prepopulated car wash type.

In some implementations, instead of, or in conjunction with, generating the replacement character sequence 432, the license plate data manager 426 can utilize information stored in the vehicle profile 402 to detect or identify a vehicle 130 (e.g., within the region of interest 135). For example, the license plate data manager 426 can receive the original character sequence 424 from the license plate processor 202, and compare the original character sequence 424 to the license plate data 404 stored in the vehicle profiles 402. Upon determining that the original character sequence 424 is different from each license plate number (e.g., license plate character sequence) in the license plate data 404, the license plate data manager 426 can shorten the original character sequence 424. For example, a last character in the original character sequence 424 can be removed such that a length of the original character sequence 424 is adjusted from 6 characters to 5 characters. The license plate data manager 426 can compare the shortened original character sequence 424 with the license plate data 404. The license plate data manager 426 can include and utilize a character sequence length threshold. The character sequence length threshold can indicate a minimum length of the shortened original character sequence 424, such as 4. For example, if the license plate data manager 426 shortens the shortened original character sequence 424 to 4 and the shortened original character sequence 424 remains different from the license plate data 404, the license plate data manager 426 compares the original character sequence 424 to the character replacement schema 428 to identify the vehicle 130.

In some implementations, the original character sequence 424 matches the license plate number in one vehicle profile 402. In such cases, the license plate data manager 426 can determine that the one vehicle profile 402 corresponds to the vehicle 130. For instance, license plate recognition system can utilize a positional search methodology. This can include configuring a positional search with a minimum starting sequence, such as four characters, to improve the accuracy of license plate matches. In some situations, license plates can be obscured or difficult to read, due to dirt, glare, obstructions or other challenges. In such scenarios, when a camera scans a plate, the camera manager can incorrectly output a license plate string of characters, such as for example "ABC123." The system can first check the database for an exact match of all six characters against various license plate entries in the system. If no exact match is found, the system can perform positional searches by progressively reducing the number of characters from the string considered. For instance, the system can remove one of the six license plate characters to repeat the search with five of the six string characters, such as by starting with "ABC12" to see if there is a match. In the event that no matches are identified, the system can reduce another characters and continue with "BC12" and so on. This reduction of characters can allow the system to identify potential matches even when the exact plate number is not available, thereby increasing the recognition and decreasing the chance of false negatives.

The positional searching can incorporate utilization, processing and evaluation of metadata to further refine the search results and improve the reliability of the recognitions. Metadata utilized can include, for example, plate region, vehicle color, make, model, and type, each of which can be considered during the search process and determining of the vehicle identity. For example, if the initial search for "ABC123" returns no results, the system can perform a positional search for "ABC12," which may yield multiple results. These results can be further filtered based on vehicle characteristics, such as the vehicle color, body style or other features, allowing the system to identify the vehicle based on the metadata. In some instances, the system can rank the multiple matching results based on the metadata matches to which weights are applied. The system can apply a higher weight given to matches in the plate region, followed by matches based on the vehicle color, make, and type. This ranking technique can allow for the most relevant matches to be prioritized, improving the overall accuracy and reliability of the license plate recognition system.

For example, a camera can scan a plate with the value "ABC123" in the region VA, and the vehicle can be a white Chevrolet Silverado pickup. The system can perform a search for license plate data using the initial search for "ABC123", resulting in no results. In response to receiving no results, the data processing system can then proceed to implement a positional search using a portion of the license plate (e.g., subset of the characters) as the input. In such a step, the data processing system can determine that for "ABC12" there may be several matches, including "ABC12E", "ABC125", and "ABC122" of the same state or country. The data processing system can then have each of these matches ranked based on the metadata corresponding to the vehicle data of each of these license plates. For instance, "ABC12E" can receive the highest score due to matching the region (e.g., state), make, color, and vehicle type, thereby being identified as the most likely result. This refined search process can improve the system's ability to accurately recognize license plates, even in cases where the exact plate number is not available. In another example, upon determining that the shortened original character sequence 424 is the same as at least one license plate number in the license plate data 404, the license plate data manager 426 receives the vehicle characteristic 418 from the camera manager 206 based on the images 416. The vehicle characteristic 418 can include at least one of a region of the license plate 132 (e.g., state), color, make, model, or type (e.g., metadata) of the vehicle 130. Once received, the license plate data manager 426 can compare the vehicle characteristic 418 to at least one of the license plate data 404 and the information 412 stored in the vehicle profiles 402. For example, the license plate data manager 426 compares the region of the license plate 132 of the vehicle 130 in the images 416 to regions in the license plate data 404 to identify the vehicle profile 402 associated with the vehicle 130. The license plate data manager 426 compares the vehicle characteristic 418 to data stored in the vehicle profiles 402 with the vehicle profiles 402 matching the shortened original character sequence 424. The license plate data manager 426 can include weights with the vehicle characteristic 418 for comparing the vehicle 130 to the vehicle profiles 402. For example, a weight of the region of the license plate 132 can be higher than a weight of the color, make, model, or type. The license plate data manager 426 identifies a match percentage between the vehicle characteristic 418 and the vehicle profiles 402, and determines the vehicle profile 402 corresponding to the vehicle 130 based on a highest match percentage. For example, the license plate data manager 426 determines a difference between each of the region, make, model, color, and type of the vehicle 130 with the region, make, model, color, and type of vehicle stored in each of the vehicle profiles 402, weighs the differences, and determines the match percentage for each of the vehicle profiles 402 with the vehicle 130 based on the weighted difference.

Following identification of the vehicle profile 402, the license plate data manager 426 can transmit (e.g., the operator device 150, the admin device 162) data to a device included in the vehicle profile 402 based on (e.g., in response to) identifying the vehicle profile 402. The data included in the vehicle profile 402 can include at least one of the license plate data 404, the car wash type 406, the service setting 408, the service 410, or the information 412. The data can be displayed on the device. For example, the license plate data manager 426 can transmit the data for presentation at the device. The device can be at least one of the operator device 150, the administrator device 162, or a point of sale device (e.g., cash register) of the third party server 190. For example, the operator device 150 can display the car wash type 406. In some implementations, the license plate data manager 426 provides the data to the GUI manager 212 for display on at least one of the operator device 150, the administrator device 162, or the point of sale device of the third party server 190.

The license plate data manager 426 transmitting the data to the device can include transmitting, to the car wash service manager 208, instructions to cause the car wash tunnel system 105 (e.g., the car wash) to provide the car wash type 406 corresponding to the vehicle profile 402 to the respective vehicle 130. The instructions can include the car wash type 406, and can be stored in the vehicle profiles 402. Responsive to identifying the vehicle 130, at least one of the profile manager 204 can determine the car wash type 406 associated with the vehicle profile 402 of the vehicle 130 in the region of interest 135, and instruct the car wash service manager 208 to provide the vehicle 130 with the car wash type 406. In some implementations, the profile manager 204 includes the ML model 222 to determine the car wash type 406 based on, for example, the replacement character sequence 432 or one or more images of the vehicle 130 or the vehicle license plate 132. The car wash service manager 208 can store services 410. Each of the services 410 can correspond to at least one car wash type 406. For example, the car wash service manager 208 can receive the car wash type 406, determine the service 410 correlating to the car wash type 406, and transmit instructions to the car wash controller 104 to implement the service 410 for the vehicle 130. In some implementations, the profile manager 204 determines the service setting 408 and provides the service setting 408 to the car wash service manager 208. Based on the service setting 408, the car wash service manager 208 can determine and transmit the service 410 to the car wash controller 104.

In some implementations, the GUI manager 212 generates the prompt 414 corresponding to the service 410. The prompt 414 can include an indication of the service 410 to be provided to the vehicle 130. In some implementations, the GUI manager 212 receives an update to the service 410 to be provided. The update can include an adjustment to the service setting 408 or the service 410, and can be provided by a driver or an operator. The GUI manager 212 can provide the update to the profile manager 204. The profile manager 204 can then store the update (e.g., updated service) in the vehicle profile 402 as the service setting 408. For example, the update includes an additional add-on service such as a tire shine, and the profile manager 204 includes the update in the service setting 408.

In some implementations, the profile manager 204 includes and tracks a discrepancy counter associated with each of the vehicle profiles 402. For example, after detecting the discrepancy 422, the camera manager 206 adds to the discrepancy counter maintained in the profile manager 204. The discrepancy counter can represent a number of times that the discrepancy 422 was detected for the license plate data 404 (e.g., license plate 132) associated with the vehicle profile 402. The profile manager 204 can maintain the discrepancy counter and compare a value of the discrepancy counter to a discrepancy threshold. Responsive to the value being below the discrepancy threshold, the profile manager 204 continues to maintain the discrepancy counter. Responsive to the value being at or above the discrepancy threshold, the profile manager 204 can generate an alert for at least one of the operator device 150 or the admin device 162. The profile manager 204 can then mark (e.g., flag) the vehicle profile 402 associated with the value of the discrepancy counter being at or above the discrepancy threshold. Once marked, responsive to the profile manager 204 identifying the vehicle profile 402 based on the replacement character sequence 432 and determining that the vehicle profile 402 is marked, the profile manager 204 can transmit instructions to the data processing system 118 to not allow (e.g., not actuate the gates 160) the vehicle 130 into car wash vehicle queue. The profile manager 204 can generate an alert for at least one of the operator device 150 or the admin device 162 based on determining that the vehicle profile 402 is marked. The alert can indicate that the vehicle 130 in the region of interest 135 has a marked vehicle profile 402.

Data processing system 118 can include the functionality for utilizing QR codes 166 to allow for vehicle identification, verification, and user selection and customization of vehicle services. For example, upon driving up to a lane 134 or a gate 160 of a facility 100, a user (e.g., a driver) can scan the QR code 166 using their smartphone. The QR code 166 can be positioned at any location at the facility 100, including on, adjacent to, or along a lane 134, a gate 160, entrance to a tunnel 140 or car wash tunnel system 105. Upon scanning, the QR code 166 can direct the smartphone of the user to a webpage where the user can select from a variety of car wash services of the facility 100, including a basic wash, a premium wash, or a special polishing service. The user can also choose to upgrade their service type from a one-time wash to a monthly or annual subscription. The webpage or the application provided via the QR code 166 can allow the user to configure specific preferences associated with the vehicle profile 402 or vehicle data or information 412, such as opting for a tire shine or an underbody wash. Once the user has made their selections, the data processing system 118 can process the request and update the user's profile with the chosen services, ensuring that the car wash tunnel system 105 is prepared to provide the selected services when the vehicle enters the tunnel 140.

The QR code 166 can be used in conjunction with a license plate processor 202 to enhance security and personalization of services. For instance, when the user scans the QR code 166, the data processing system 118 can verify the user's identity by matching the data (e.g., identifier) of the smartphone that scanned the QR code with the license plate data captured by the license plate processor 202. The identifier can include, for example, the phone's unique device ID, the user's account information, or a session token generated by the application. This verification process can validate the smartphone with the recognized license plate data to ensure that the services are provided to the correct vehicle and user. For instance, if the license plate processor 202 recognizes the license plate of the vehicle and matches it with the phone identifier, the data processing system 118 can grant access to the user's profile or account, allowing them to manage their services and preferences. This feature can provide an additional layer of security and personalization, ensuring that the services are tailored to the specific needs and preferences of the user.

For example, the feature can be implemented by positioning a QR code 166 next to a gate 160, where a user can scan the QR code 166 with their smartphone. For example, the feature can be implemented by positioning a QR code 166 next to a gate 160, where a user can scan the QR code 166 using their smartphone. The data processing system 118 can then allow the user to continue following the prompts from the link provided via the QR code to authenticate the user. Once authenticated, the smartphone of the user can be assigned an identifier for the smartphone. This identifier can be used to verify the user's identity. For instance, the system can match the phone identifier received via the smartphone using the QR code 166 with the license plate data captured by the license plate processor 202. Upon successful verification, the data processing system 118 can grant access to the user's profile, allowing them to select and configure car wash services, change their service type, and update their preferences. The car wash tunnel system 105 can then be prepared to provide the selected services when the vehicle enters the tunnel, ensuring a personalized and efficient car wash experience.

Data processing system 118 can be configured to utilize Bluetooth beacons, other wireless beacons, or transponder devices to identify users and vehicles within the facility 100. Car beacons can be installed in vehicles and can transmit a unique identifier (e.g., unique vehicle identifier) that can be detected by the facility's beacon receivers or reader devices. When a vehicle equipped with a car beacon or transponder device enters the facility 100 (e.g., premises or a car wash building), the beacon receiver or reader device can capture the unique identifier and transmit it to the data processing system 118. The data processing system 118 can then match the unique identifier with the vehicle profile 402 or vehicle data 412 stored in the system, allowing for seamless identification and verification of the vehicle. In response to the identification and verification, the system can allow the user to access vehicle data or client account and make changes, such as service configures or service selections for the vehicle. This can allow the system to provide personalized services and streamline the user experience by automatically recognizing the vehicle and its associated preferences.

The transponder devices can include at least one radio-frequency identification (RFID) tag which includes the unique identifier. The reader device can emit radio signals, and the RFID tag can receive the radio signals and return the unique identifier. The reader device can capture the unique identifier and transmit the unique identifier to the data processing system to identify and verify the vehicle. As with other transponder device examples, the RFID tags can be utilized to uniquely identify a user or the vehicle and can be used in combination with other techniques (e.g., license plate recognition or QR code scanning) to validate identification of the user and provide access to user data and service control functionalities.

For instance, phone beacons, transponders or RFID tags can be used to identify users based on the unique identifier or signal transmitted by their smartphones. For instance, a phone beacon can be any wireless device that transmits a unique identifier from a smartphone, allowing the data processing system 118 to detect and identify the user based on the transmitted identifier. When a user with a phone beacon-enabled smartphone, or an RFID tag, enters the facility, the beacon receiver or reader device can detect the unique identifier and send it to the data processing system 118. The data processing system 118 can match the unique identifier with the user's profile or account information, allowing for personalized service customization and verification. For example, the system can grant access to the user's profile, enabling them to select and configure car wash services, change their service type, and update their preferences. This integration of phone beacons can improve security and personalization, providing for services that the users can tailor to their specific needs and preferences.

For example, the feature can be implemented by installing car beacons or transponder devices in vehicles and configuring the data processing system 118 to detect the unique identifier transmitted by the car beacon or transponder device (e.g., RFID tag) when the vehicle enters the facility. The beacon receiver or reader device can capture the unique identifier and transmit it to the data processing system 118, which can then match the identifier with the vehicle profile 402 or vehicle data 412. Upon successful identification, the data processing system 118 can grant access to the user's profile, allowing them to select and configure car wash services, change their service type, and update their preferences. The car wash tunnel system 105 can then be prepared to provide the selected services when the vehicle enters the tunnel, ensuring a personalized and efficient car wash experience.

The car beacon or transponder devices (e.g., RFID tags) can be used in conjunction with a license plate processor 202 or QR codes 166 to enhance security and personalization of services. For instance, when a radio signal (e.g., beacon signal) from a car beacon or transponder device indicates or identifies a particular vehicle or a user associated with a vehicle, the data processing system 118 can verify or validate the user's identity by matching the data of the radio signal with a license plate data determined by a license plate processor 202 or a scanned the QR code. The data of the radio or beacon signal can include signal information or code uniquely identifying a vehicle or user of the vehicle, which can be matched with QR code data or license plate data to validate or verify the identification. This verification process can improve the security of the system and ensure that the services are provided to the correct vehicle and user. For instance, if the license plate processor 202 recognizes the license plate of the vehicle and matches it with the beacon signal, the data processing system 118 can grant access to the user's profile or account, allowing them to manage their services and preferences.

Upon identifying vehicle characteristics 418, the camera manager 206 can compare the vehicle characteristic 418 to one or more characteristics of the vehicle 130 (e.g., vehicle characteristics 418) determined from prior captured images. The log manager 214 can maintain (e.g., include) the image log 420 (e.g., image database) of vehicles 130 which can include one or more prior captured images (e.g., images 416) indexed according to the license plate data 404. For example, the prior captured images are categorized and associated with license plate data 404 of each of the vehicle profiles 402. The camera manger 206 can compare the vehicle characteristic 418 using the ML model 222, and determine, for example, a difference or similarity value between the vehicle characteristic 418 and the characteristics in the prior captured images. The camera manager 206 can extract the prior captured images from the image log 420 to compare the vehicle characteristic 418. In some implementations, the prior captured images are stored in the vehicle profiles 402 as a type of information 412. For example, each of the vehicle profiles 402 can include the image log 420.

A log manager 214 can include any number of image logs 420, which can include any collection of images of vehicles captured over time. A log manager 214 can maintain images of each vehicle associated with each of the vehicle profiles 402 that may be captured over time. For instance, a log manager 214 can maintain a log of images of a vehicle 130 associated with a vehicle profile 402 captured during each of the visits of the vehicle to the facility 100. The images of the vehicle from the image log 420 can be stored within or associated with the vehicle profile 402 and can be used for a quick lookup of the vehicle 130. For instance, when a vehicle 130 enters a facility 100, the camera manager 206 can capture a recent image of the vehicle 130, which can be used by the license plate data manager 426 for detecting the license plate (e.g., via character replacement schema 428 and the replacement character sequence 432) and comparing vehicle characteristics 418 from the recent image (e.g., using machine learning) and comparing the recent characteristics with the previously stored characteristics of the vehicle profile 402. The log manager 214 can facilitate quick lookups or verification of the vehicle 130 identity using image logs 420 for comparison of the vehicle data with the data stored in the vehicle profile 402.

Based on the comparison between the vehicle characteristics 418 and of prior captured images of the vehicle 130, the camera manager 206 can determine (e.g., detect) a discrepancy 422 (e.g., difference, error). For example, the camera manager 206 compares the one or more images 416 of the vehicle 130 with the prior captured images of the vehicle 130 to determine the discrepancy 422. As another example, the camera manager 206 can include the ML model 222 which can receive the images 418 and the prior captured images, and determine the discrepancy 422 as an output. The camera manager 206 can determine the vehicle characteristics 418 for the images 416 and the prior captured images, and then determine a difference between the vehicle characteristics 418 of the images 416 and the prior captured images. The camera manager 206 can compare the determined difference to a threshold and responsive to the difference exceeding a threshold, the camera manager 206 can identify, determine or detect the discrepancy 422. In some implementations, the vehicle characteristic 418 is stored in the image log 420, and each of the prior captured images has a respective vehicle characteristic 418. For example, the camera manager 206 determines the vehicle characteristics 418 as the images 416 are received, and stores both the vehicle characteristic 418 and the image 416 into the image log 420. In some embodiments, the vehicle profile of a vehicle can include one or more vehicle characteristics 418, including car brand, car type, car model, year, color, number of doors, and any accessories, add-ons, or modifications to the vehicle 130. The vehicle profile can also store one or more visual deformities to the vehicle, for instance, scratch of driver door, paint discoloration on roof, etc. In some such embodiments, the camera manager 206 can determine the discrepancy 4222 by comparing characteristics 418 with the information stored in the vehicle profile instead of comparing it to previously stored or captured images of the vehicle. In some embodiments, the camera manager 206 can determine the discrepancy 422 by comparing characteristics 418 with the information stored in the vehicle profile and to previously stored or captured images of the vehicle.

In response to detecting the discrepancy 422, the camera manager 206 can detect (e.g., determine or identify) a fraudulent activity (e.g., false, deceiving activity). The fraudulent activity can include, for example, multiple vehicles 130 (e.g., a car, a van, a motorcycle) using a same license plate (e.g., license plate 132) to receive services 410 from the service facility 100. The fraudulent activity can be due to the license plate 132 being meant for only a single vehicle 130, thereby rendering the remaining vehicles using the same license plate 132 fraudulently using the services. The detected or determined discrepancy 422 can include an indication of the fraudulent activity, such as a degree of difference between the vehicle characteristics 418 of the images 416 and the prior captured images. For example, the discrepancy 422 can include indications of an amount (e.g., value, degree) of difference between the color, size, features, etc. of the vehicle characteristics 418 of the images 416 compared to the prior captured images. As such, the camera manager 206 can determine the fraudulent activity by comparing the amount of difference included in the discrepancy 422 to one or more thresholds. For example, the camera manager 206 can store one or more fraudulent activities corresponding to one or more thresholds related to the amount of threshold. The camera manager 206 can then determine the fraudulent activity based on comparing the amount of difference to the one or more thresholds.

The camera manager 206 can determine the fraudulent activity using the ML model 222. For instance, one or more ML models 222 can receive as inputs one or more images of capturing one or more vehicle features (e.g., vehicle color or shape) and a license plate. The one or more ML models 222 can determine that the vehicle features do not match the vehicle license plate associated with a vehicle profile 402. The one or more ML models 222 can determine, in response to this determination, that a fraudulent transaction or action has occurred or is being attempted and provide output, such as an alert or an indication of the fraudulent action (e.g., on one or more GUIs 250 at operator devices 150).

Responsive to determining the fraudulent activity (e.g., multiple vehicles 130 using the same license plate 132), the camera manager 206 can transmit an instruction to the profile manager 204 to update the information 412 on the vehicle profile 402. The update to the information 412 can include an indication of the fraudulent activity or discrepancy 422. The update can include an indication to not allow (e.g., not actuate the gates 160 for) the vehicles 130 with the same license plate 132 into the tunnel 140. In some implementations, the update includes an amount of time (e.g., time interval) for which the vehicle 130 with the same license plate 132 is not allowed into the tunnel 140. For example, responsive to determining the discrepancy 422, the camera manager 206 sets and transmits to the profile manager 204 an amount of time that the vehicle 130 will not be provided with services from the service facility 100.

The profile manager 204 can be configured to prepopulate orders (e.g., car wash type 406 or service settings 408) based on vehicle identification. For instance, the profile manager 204 and the license plate data manager 426 can utilize the comparison of the replacement character sequence 432 and the license plate data 404 to automate car wash type 406 selection or automate service setting 408 instructions for the car wash tunnel system 105. For example, a profile manager 204 can store prior user selections of services provided in the form of preferred car wash type 406. In response to identifying the vehicle 130 and identifying or selecting the vehicle profile 402, the profile manager 204 can prepopulate the selection of the car wash type 406 (e.g., type of service to provide), automatically generating instructions for the service setting 408 to be used by the car wash tunnel system 105 in providing the desired service.

The GUI manager 212 can generate and provide various information for display on devices. For example, the GUI manager 212 can generate a prompt 414. The prompt 414 can be associated with at least one of the car wash type 406, the service setting 408, and/or the service 410 stored in the vehicle profiles 402. Following determination of the service 410 to be provided to the vehicle 130 based on the vehicle profile 402, the profile manager 204 can instruct the GUI manager 212 to provide the prompt 414 for display on a device (e.g., operator device 150, admin device 162). The prompt 414 can indicate the service 410 to be provided to the vehicle 130. In some implementations, the prompt 414 indicates a time until the service 410 is to be provided to the vehicle 130. For example, the profile manager 204 can receive a length of time left for a preceding vehicle in the car wash tunnel system 105, and include the length of time in the prompt 414.

In response to detecting the discrepancy 422 and the fraudulent activity, the camera manager 206 can transmit an instruction to the GUI manager 212 to generate an alert based on the discrepancy 422 and the fraudulent activity.

The GUI manager 212 can transmit the alert for display on a device (e.g., the operator device 150, the admin device 162) to indicate (e.g., notify of) the fraudulent activity. In some implementations, the alert can include a text string related to the determined fraudulent activity.

Figure 5:
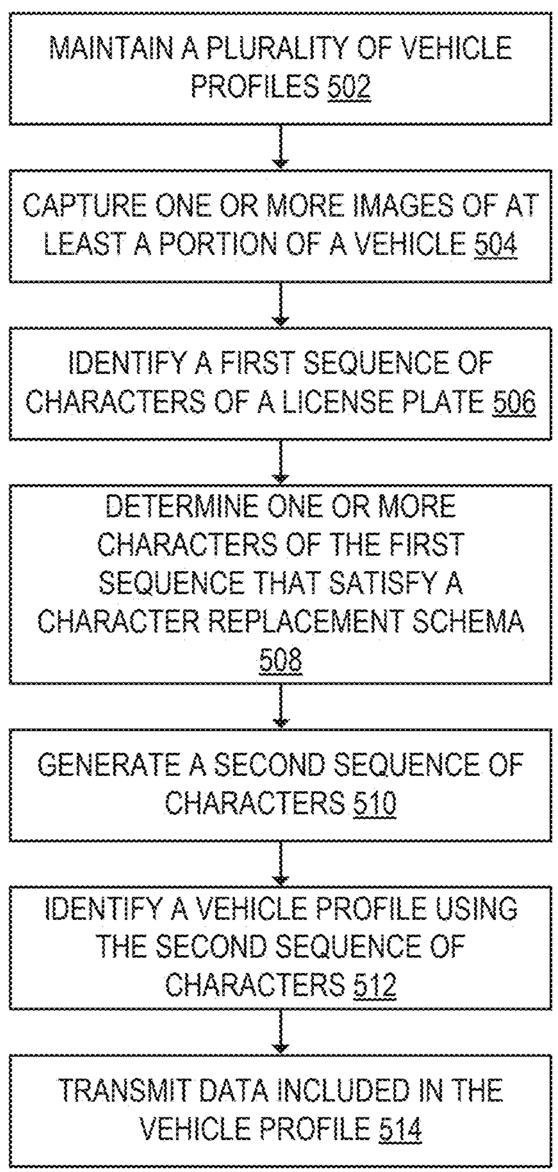
FIG. 5 is an example flow diagram of a method for automated vehicle recognition at service facilities.

FIG. 5 is an example method 500 for implementing at least one of the systems 200, 300, or 400 as described above. For instance, the example method 500 can be implemented using one or more processors (e.g., 310) executing instructions or data stored in one or more memories (e.g., 315, 320 or 325) of a computing device or an environment. The method 500 can include acts or operations indicated by blocks 502-512, which can be performed in any order or out of order illustrated in FIG. 5. For instance, depending on implementation, any of the acts corresponding to blocks 502-512 can be performed multiple times, omitted or performed in any order.

At block 502, the method 500 can include maintaining a plurality of vehicle profiles (e.g., vehicle profiles 402). The plurality of vehicle profiles can be maintained for a plurality of vehicles (e.g., vehicle 130). Each vehicle profile of the plurality of vehicle profiles can include license plate information (e.g., license plate data 404) of a respective vehicle of the plurality of vehicles. Each vehicle profile of the plurality of vehicle profiles can include additional vehicle information, such as a make, model, and type of the vehicle. In some implementations, a service (e.g., car wash type, car wash service), can be stored in each vehicle profile.

At block 504, the method 500 can include capturing one or more images of at least a portion of a vehicle. The at least a portion of the vehicle can be positioned within a region of interest (e.g., region of interest 135) of a service facility (e.g., service facility 100). One or more cameras can capture the images, such as gate cameras or tunnel cameras positioned at various regions of interest or tunnel entrance. The images can be stored in an image log. The images can be captured by the cameras responsive to the vehicle entering the region of interest or field of view of a tunnel camera at the tunnel entrance. For example, responsive to no vehicle being within the region of interest the cameras may not capture images.

At block 506, the method 500 can include identifying a first sequence of characters (e.g., original character sequence 424) of a license plate (e.g., license plate 132) of the vehicle. The data processing system can identify a first sequence of characters from the images of the vehicle. An image recognition model, such as OCR, can be used to identify and extract the first sequence of characters. The data processing system can identify the sequence of characters of the license plate using, for example, one or more ML models trained to recognize characters or identify the license plate original character sequence from the images.

For example, the method can include identifying a characteristic of the vehicle based on the images input into one or more ML models trained to identify vehicle characteristics from the images of the vehicle. The characteristic can include, for example, a width, height, or color of the vehicle, as well as shape of the vehicle or a portion of the vehicle, configurations added to the vehicle (e.g., roof rack or spoiler) or any other features that can distinguish one vehicle from another. In some implementations, the vehicle profile includes or stores various characteristics of the vehicle. The characteristics of the vehicles can include characteristics identified from prior captured images, which can be stored in the image log. Upon identifying the characteristic of the vehicles from the images, the data processing system can store the characteristic in the vehicle profile.

At block 508, the method 500 can include determining one or more characters of the first sequence that satisfy a character replacement schema (e.g., character replacement schema 428). The one or more characters that satisfy the character replacement schema can be determined using a lookup table. For example, the data processing system can compare one or more characters of the first sequence with one or more replacement characters (e.g., characters that satisfy the character replacement schema) to the lookup table. The lookup table can relate the one or more characters of the first sequence with the one or more corresponding replacement characters. The lookup table can include one or more representative character pairs which can relate at least one of: a character “1” and a character “I”, a character “2” and a character “Z”, a character “5” and a character “S”, a character “0” and a character “O”, or a character “A” and a character. Using the comparison, the data processing system can match the one or more characters of the first sequence with the one or more corresponding replacement characters. Based on the match, the one or more characters of the first sequence that satisfy the character replacement schema can be determined.

The data processing system can utilize one or more ML models to detect, identify or determine one or more characters of the first sequence that satisfy a character replacement schema. For instance, a license plate processor or a license plate data manager can utilize one or more ML models trained to detect and identify original character sequences that are subject to the character replacement schema. The one or more ML models can detect, within the original character sequence, one or more characters that are subject to the character replacement schema (e.g., characters to be replaced in the sequence), such as character: “O” or “0”, character “1” or “I” or character “2” or “Z”.

In some implementations, based on the comparison of the characteristics of the vehicle between the images and prior captured images, the data processing system can detect a discrepancy. The discrepancy can indicate a difference between the characteristics of the images and the prior captured images. For example, the characteristic of the vehicle of the images can include that the vehicle is a blue color while the characteristic of the vehicle of the prior captured images indicate that the vehicle is white. For example, a camera manager can utilize one or more ML models to detect vehicle characteristics (e.g., vehicle shape, color, customized additions) or any prior damage to the vehicle. The ML models can be trained to compare current images from the cameras on the facility against other images of prior vehicle visits (e.g., on prior dates). The one or more ML models can be trained to compare vehicle characteristics of the vehicle having the same license plate between the current visit and prior visits and identify any changes in the characteristics (e.g., changes in the color, a recently installed or removed roof rack or a damage to the vehicle that was not present during the prior vehicle visit).

At block 510, the method 500 can include generating a second sequence of characters (e.g., replacement character sequence 432). The second sequence of characters can be generated by replacing the one or more characters that satisfy the character replacement schema with one or more corresponding replacement characters in the first sequence of characters. Using a lookup table, the data processing system can select one or more representative character pairs that correspond to the one or more characters of the first sequence. The lookup table can relate characters of license plates with replacement characters for the license plates. For example, the lookup table can include the one or more representative character pairs which relate at least one of: a character "1" and a character "I", a character "2" and a character "Z", a character "5" and a character "S", a character "0" and a character "O", or a character "A" and a character "4". Responsive to the selection, the second sequence of characters can be generated. For example, the second sequence of characters can be the first sequence of characters with replacement characters based on the lookup table.

At block 512, the method 500 can include identifying a vehicle profile (e.g., the vehicle profile 402) using the second sequence of characters. The data processing system can identify the vehicle profile from a plurality of vehicle profiles maintained in a database, and the vehicle profile can be identified based on executing a query (e.g., 434) using the generated second sequence of characters (e.g., the replacement character sequence). The vehicle profile can be associated with the vehicle positioned within the region of interest. In some implementations, in response to the discrepancy being identified, the method can include detecting a fraudulent activity (e.g., a mismatch between characteristics of a vehicle and license plate data of the vehicle). For example, one or more ML models can detect that a difference between the vehicle characteristics for the same license plate between two different events (e.g., current event a prior event) is greater than a predetermined threshold for the characteristic difference. In response to the vehicle characteristics of the vehicles associated with the same license plate data being greater than a threshold, the one or more ML models can determine a discrepancy.

In response to a detected discrepancy, the data processing system can generate an alert for display or sounding on a device, such as an operator device, to indicate the fraudulent activity following identification of the vehicle profile. Based on the discrepancy, the method can include determining that multiple vehicles have used the license plate for services of the service facility. For example, the vehicle profile includes a discrepancy counter which indicates a number of times a discrepancy has been detected for a respective vehicle. Information on the vehicle can then be updated responsive to the determination that the multiple vehicles have used the license plate. The information can include the discrepancy counter and can include an indication to not allow the vehicle into a car wash tunnel system.

In some implementations, the data processing system can maintain an image log of the vehicle. The image log can include one or more prior captured images indexed according to the license plate information. The image log can be included in each vehicle profile. The one or more images of the vehicle can be compared with the one or more prior captured images to detect discrepancies in vehicle characteristics. In some implementations, based on the vehicle profile, a service setting for the vehicle can be identified. The service setting can refer to a car wash type, a type of service, or a number of services, among others, and can be stored in each vehicle profile. Based on the service setting, the data processing system can generate a service to be provided to the vehicle. The service can be transmitted to a car wash controller to provide the service to the vehicle.

At block 514, the method 500 can include transmitting data included in the vehicle profile based on identifying the vehicle profile to a device (e.g., operator device 150, admin device 162). The data transmitted to the device can be data for presentation at the device. The device can be at least one of an operator device, an administrator device, or a point of sale device of a third party server. To transmit the data, the method 500 can include transmitting instructions to a car wash controller to cause the service facility to provide a car wash type corresponding to the vehicle profile of the vehicle. A setting, such as the service setting, can be retrieved from the vehicle profile for the car wash routine of a vehicle service at the service facility. Based on the setting, the data processing system can actuate a component controlling access to the service facility, such as a gate, to initiate the car wash routine. A prompt for the service to be provided can be provided for display on a device, such as the operator device. Responsive to the prompt, an update can be received to the service to be provided. The update can be provided by a driver. Responsive to receiving the updated service, the data processing system can store the update the vehicle profile as the service setting.

Figure 6:
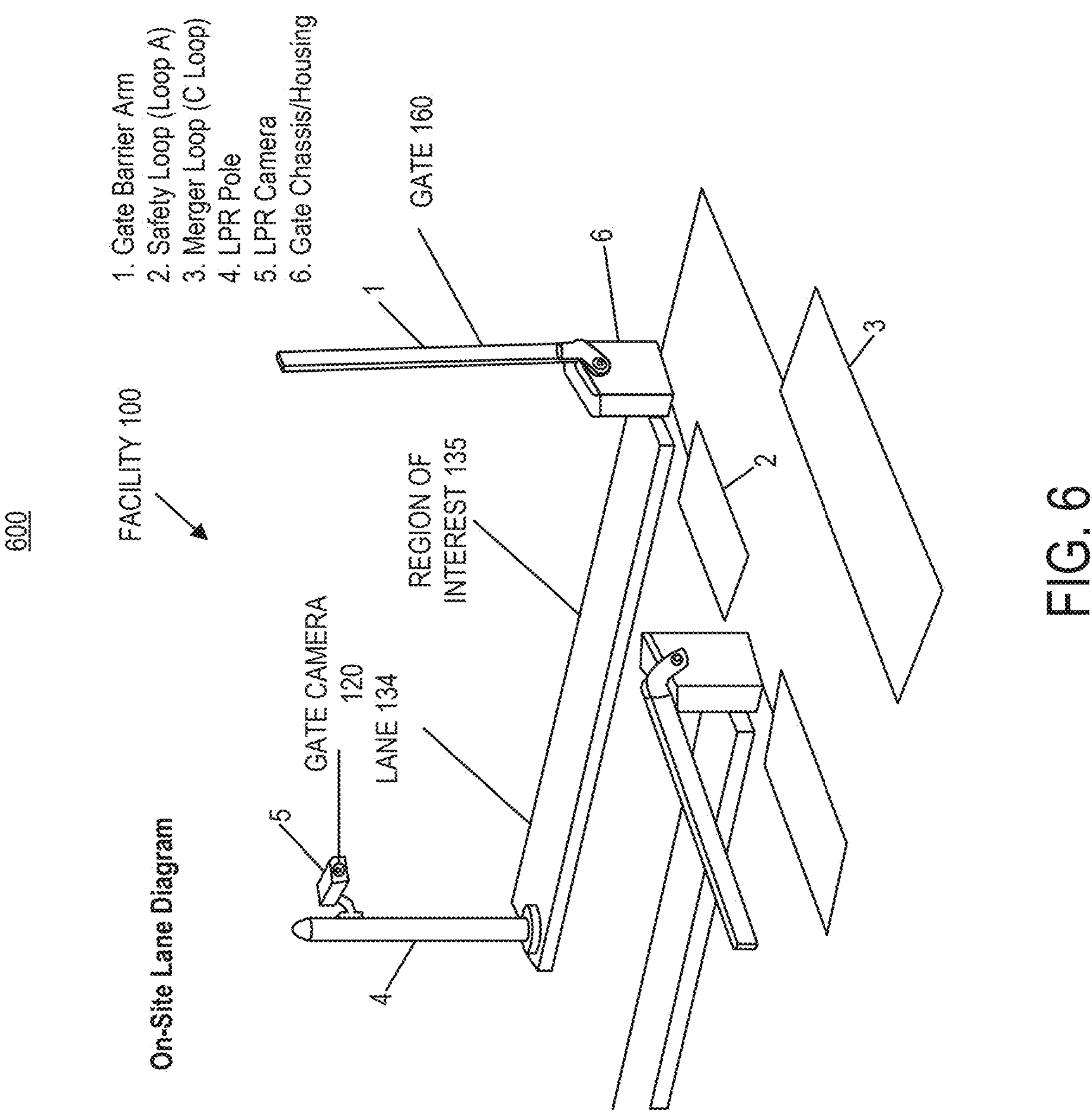
FIG. 6 is an example diagram of a portion of a vehicle service facility.

Referring now to FIG. 6, FIG. 6 depicts an example portion 600 of the service facility 100 which can include the gates 160, the region of interest 135, the lane 134, and the gate camera 120. The example portion 600 can include one or more loops which can detect a presence of the vehicle 130. The gates 160 can include a gate barrier arm and a housing. The gate camera 120 can be mounted onto a pole and face a direction of the gate 160.

Figure 7A:
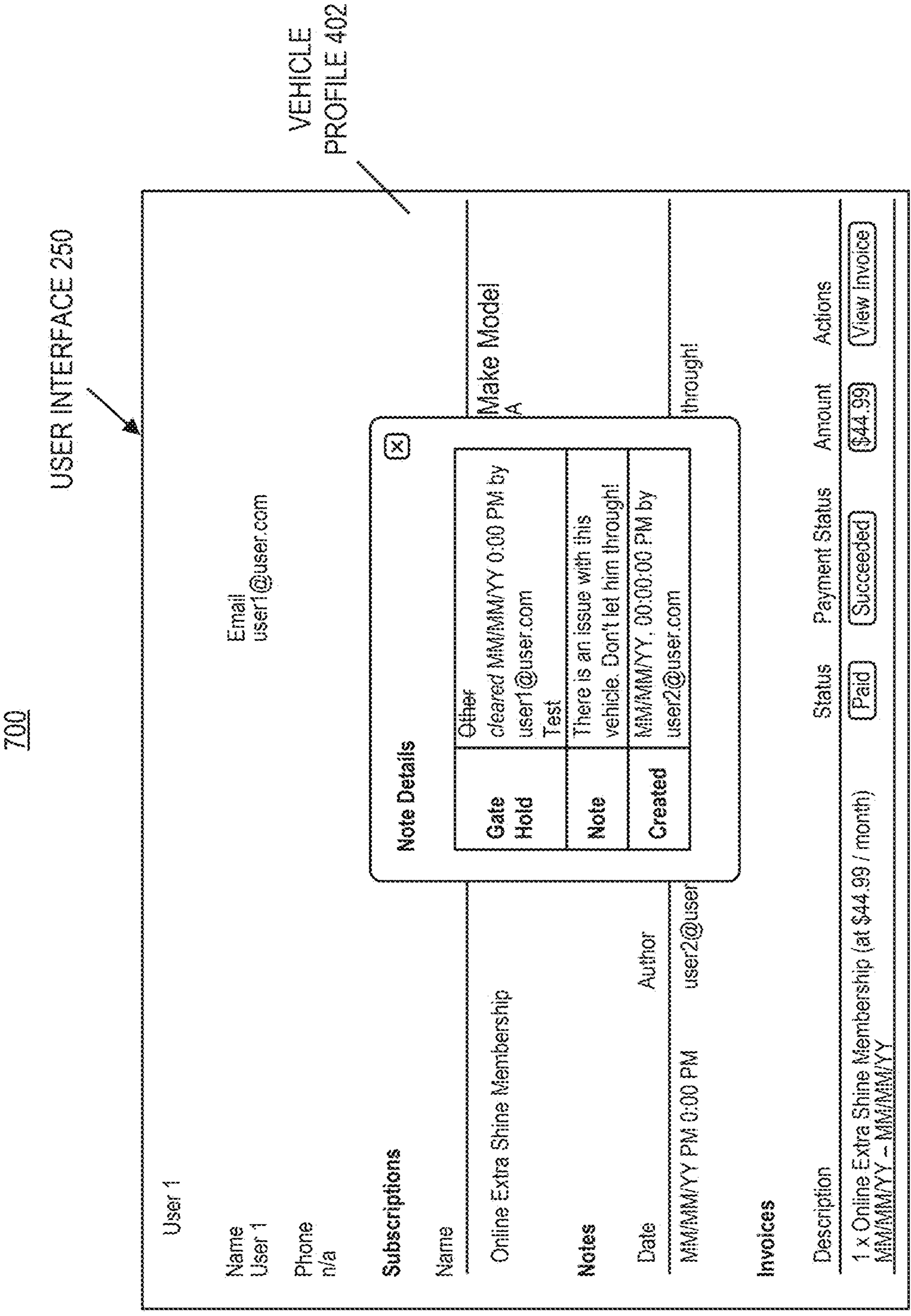
Figure 7C:
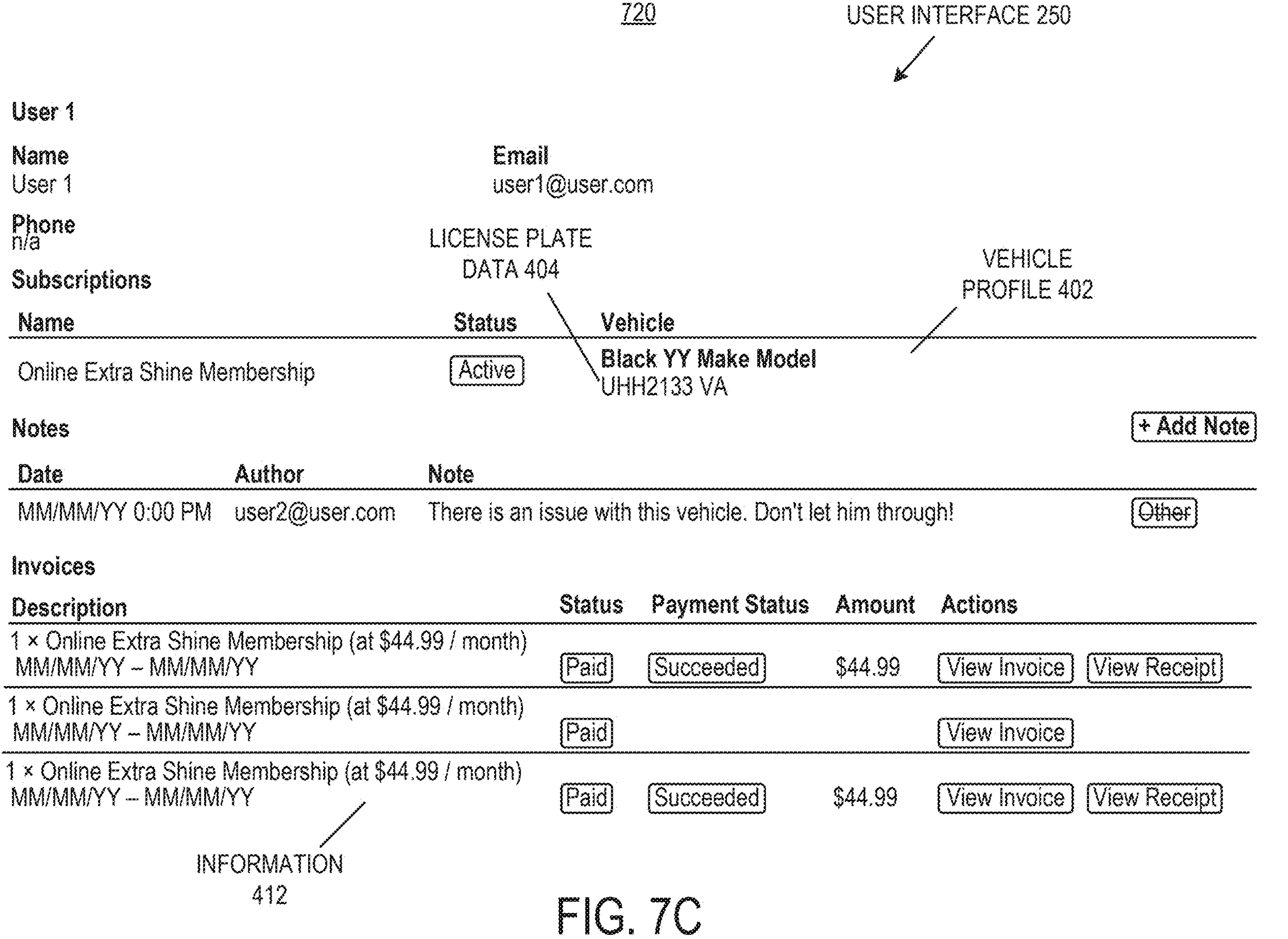

Referring now to FIGS. 7A-7C, implementations of screenshots of one or more user interfaces of one or more applications for providing or implementing various features of the automated operation platform for a vehicle service facility are illustrated. Specifically, the screenshots of FIGS. 7A-7C illustrate an example user profile for recording and tracking a make, model, and license plate of the car, as well as times at which the user has had their car washed. The one or more applications may track changes between the make, model, and license plate of the car to determine whether a user may have switched license plates to wash their car more often than their subscription (e.g., service setting) allows. For example, responsive to determining that the license plate has switched more than twice in a span of one month, the application may generate a notification to the car operator, and not allow the car to enter the car wash tunnel (e.g., by not opening the gate).

A screenshot 700 can include an indication of the discrepancy 422 on the GUI 250. For example, upon detecting the discrepancy 422, the camera manager 206 transmits the discrepancy 422 to the GUI manager 212. The GUI manager 212 can generate a node based on the discrepancy 422 to notify the operator of at least one operator device 150. A screenshot 720 can include information on a number of washes the vehicle 130 for which the discrepancy 422 was detected has received along with a date and time of each wash. A screenshot 730 can include the vehicle profile 402 including at least the license plate data 404 and the information 412.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language or a script, such as Python, JavaScript, LISP, PERL, C, C++, C#, PROLOG, or JAVA. The software programs or executable instructions can be stored on or in one or more articles of manufacture as object code.

Example and non-limiting module implementation elements can include or use input providing devices, such as touchscreens, computer selection devices (e.g., computer mouse), detectors or sensors that can provide any value determined herein, as well as sensors providing any value that is a precursor to a value determined herein, datalink or network hardware including communication processors, circuits or chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more sets of computer program instructions, encoded on one or more computer storage media for execution by, or to control the operation of, data processing apparatuses. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can be, or be included in, one or more separate components or media (e.g., multiple CDs, disks, or other storage devices including cloud storage). The operations described in this specification can be implemented as operations performed by a data processing apparatus on data stored on one or more computer-readable storage devices or received from other sources.

The terms "computing device," "computing environment," "component" or "data processing apparatus" or the like encompass various apparatuses, devices, and machines for processing data, including by way of example a programmable processor, a memory, a computer, a system on a chip, or multiple ones, or combinations of the foregoing. The apparatus can include special purpose logic circuitry, e.g., an FPGA (field programmable gate array) or an ASIC (application specific integrated circuit). The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can be performed by, and apparatuses can be implemented as, special purpose logic circuitry, e.g., an FPGA (field programmable gate array) or an ASIC (application specific integrated circuit). Devices suitable for storing computer program instructions and data can include non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order. Furthermore, the terms "based on" or "responsive to" can imply both direct and indirect relationships, meaning that an action can be directly or indirectly based on or responsive to another action.

Having now described some illustrative implementations, it is apparent that the foregoing is illustrative and not limiting, having been presented by way of example. In particular, although many of the examples presented herein involve specific combinations of method acts or system elements, those acts or operations and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including" "comprising" "having" "contained" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can embrace implementations including a plurality of these elements from any section or paragraph, and any references in plural to any implementation or element or act herein can embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or implementation, and references to "an implementation", "an implementation," "some implementations," "one implementation" or the like are not necessarily mutually exclusive and are intended to indicate that a particular feature, structure, or characteristic described in connection with the implementation may be included in at least one implementation or implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A,' only 'B,' as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Modifications of described elements and acts such as variations in sizes, dimensions, structures, shapes and proportions of the various elements, values of parameters, mounting arrangements, numbers of inputs or outputs, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can be made in the design, operating conditions and arrangement of the disclosed elements and operations without departing from the scope of the present disclosure.

For example, descriptions of positive and negative electrical characteristics may be reversed. For example, a positive or a negative parameter, input, or difficulty direction with respect to a testing system can be increased or decreased, as desired. Elements described as negative or decreasing in value can instead be configured as positive or increasing in value and vice versa. For example, elements described as having a lower difficulty level can have a higher difficulty level and vice versa. Further relative parameter values described with respect to other values can include variations within +/−10% or +/−10 degrees of a pure stated value, such as with +/−10 degrees of a pure vertical, parallel, or perpendicular positioning or a signal value. References to "approximately," "substantially" or other terms of degree include variations of +/−10% from the given measurement, unit, or range unless explicitly indicated otherwise. Coupled elements can be electrically, communicatively, mechanically, or physically coupled with one another directly or with intervening elements.

While the disclosure has been described with respect to specific implementations, one skilled in the art will recognize that numerous modifications are possible. For instance, although specific examples of rules (including triggering conditions and/or resulting actions) and processes for generating suggested rules are described, other rules and processes can be implemented. Implementations of the disclosure can be realized using a variety of computer systems and communication technologies including but not limited to specific examples described herein.

Implementations of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the implementations described above may make reference to specific hardware and software components, those skilled in the art will appreciate that different combinations of hardware and/or software components can be used and that particular operations described as being implemented in hardware can be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific implementations, it will be appreciated that the disclosure is intended to cover all modifications and equivalents within the scope of the following claims.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed implementations are not representative of all claimed innovations. As such, certain aspects of the disclosure have not been discussed herein. That alternate implementations may not have been presented for a specific portion of the innovations or that further undescribed alternate implementations may be available for a portion is not to be considered a disclaimer of those alternate implementations. Thus, it is to be understood that other implementations can be utilized and functional, logical, operational, organizational, structural and/or topological modifications may be made without departing from the scope of the disclosure. As such, all examples and/or implementations are deemed to be non-limiting throughout this disclosure.

Some implementations described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process, when possible, as well as performed sequentially as described above. Furthermore, certain implementations can omit one or more described events.

All definitions, as defined and used herein, should be understood to control over dictionary definitions, definitions in documents incorporated by reference, and/or ordinary meanings of the defined terms.

In the implementations, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A system, comprising:

one or more processors, coupled with memory, to:

maintain, in a database, a plurality of vehicle profiles for a plurality of vehicles, each vehicle profile of the plurality of vehicle profiles including license plate information of a respective vehicle of the plurality of vehicles and one or more vehicle characteristics, wherein the one or more vehicle characteristics includes a color, make, or model of the vehicle;

capture, via at least one image capture device directed towards a gate or a tunnel of a car wash, one or more images of at least a portion of a vehicle positioned within a region of interest of a service facility;

identify, using the one or more images, a string of characters of a license plate of the vehicle and one or more of a vehicle color, make or model of the vehicle;

determine one or more characters of the string of characters satisfy a character replacement schema;

generate a first sequence of characters by replacing the one or more characters in the string of characters that satisfy the character replacement schema with one or more corresponding replacement characters;

determine that the first sequence of characters of the license plate does not match any license plate information of the plurality of vehicle profiles;

perform, responsive to determining that the first sequence of characters of the license plate does not match any license plate information of the plurality of vehicle profiles, a first truncation operation by removing one or more characters from the first sequence of characters to generate a first truncated sequence of characters;

execute a first search against the database using the first truncated sequence of characters;

determine that the first search using the first truncated sequence of characters does not produce any matching license plate information in the database;

perform, responsive to determining that the first search using the first truncated sequence of characters does not produce any matching license plate information in the database, a second truncation operation by removing one or more additional characters from the first truncated sequence of characters to generate a second truncated sequence of characters;

execute a second search against the database using the second truncated sequence of characters;

determine that the second search using the second truncated sequence of characters produces a plurality of matching license plate information in the database;

identify, responsive to determining that the second search using the second truncated sequence of characters produces the plurality of matching license plate information in the database, a vehicle profile of a vehicle corresponding to the matching license plate information and based on one or more of a vehicle characteristic, color, make, or model determined from the one or more images matching at least one of the color, make or model of the vehicle in the vehicle profile; and transmit i) to a car wash controller, instructions to cause the service facility to provide a service corresponding to the vehicle profile of the vehicle, or ii) to a gate actuator, a control signal to cause a state of a gate coupled to the gate actuator to change.

2. The system of claim 1, wherein the one or more processors to:

extract, from the one or more images of the vehicle, the first sequence of characters and a characteristic of the vehicle.

3. The system of claim 1, wherein the first truncation operation comprises one of removing a character from a first one of: a beginning portion of the first sequence of characters, a middle portion of the first sequence of characters or an end portion of the first sequence of characters, the character removed to generate a first truncated sequence of characters.

4. The system of claim 3, wherein the second truncation operation comprises removing a second character from another one of: the beginning portion of the first truncated sequence of characters, the middle portion of the first truncated sequence or the end portion of the first truncated sequence of characters, the second character removed to generate a second truncated sequence of characters.

5. The system of claim 1, wherein the one or more processors to:

retrieve, responsive to identifying the vehicle profile, a service setting corresponding to the vehicle profile; and generate, based on the service setting, an instruction to actuate a component controlling access to a tunnel of the service facility.

6. The system of claim 1, comprising the one or more processors to:

maintain, for each vehicle profile, an image log corresponding to prior captured images indexed according to the license plate information of the respective vehicle profile; and compare, using the image log, the one or more images of the vehicle with one or more prior captured images of the vehicle to detect a discrepancy in a characteristic of the vehicle.

7. The system of claim 1, wherein the one or more processors to generate, prior to transmitting data to the device, a prompt for confirmation by a user or operator, the prompt providing an indication of the identified vehicle profile and a car wash service to provide to the vehicle.

8. The system of claim 1, wherein the one or more processors to maintain, in the database, for each vehicle profile, an indication of prior searches performed using truncated sequences of characters in license plate identification.

9. The system of claim 1, wherein the one or more processors to generate, responsive to determining that no matching license plate information is identified after performing a plurality of truncation operations, an alert for display on the device indicating that no valid match was found.

10. The system of claim 1, wherein the one or more processors to:

retrieve, for the identified vehicle profile, a record of car wash service settings associated with the respective vehicle profile, and transmit the record to the device for presentation.

11. The system of claim 1, wherein the one or more processors to:

store, in each vehicle profile, an indication of user or operator confirmation input received in association with the respective vehicle profile.

12. A method, comprising:

maintaining, by one or more processors coupled with memory, in a database, a plurality of vehicle profiles for a plurality of vehicles, each vehicle profile of the plurality of vehicle profiles including license plate information of a respective vehicle of the plurality of vehicles and one or more vehicle characteristics, wherein the one or more vehicle characteristics includes a color, make, or model of the vehicle;

capturing, by the one or more processors, via at least one image capture device directed towards a gate or a tunnel of a car wash, one or more images of at least a portion of a vehicle positioned within a region of interest of a service facility;

identifying, by the one or more processors, using the one or more images, a string of characters of a license plate of the vehicle and one or more of a vehicle color, make or model of the vehicle;

determining, by the one or more processors, one or more characters of the string of characters satisfy a character replacement schema;

generating, by the one or more processors, a first sequence of characters by replacing the one or more characters in the string of characters that satisfy the character replacement schema with one or more corresponding replacement characters;

determining, by the one or more processors, that the first sequence of characters of the license plate does not match any license plate information of the plurality of vehicle profiles;

performing, by the one or more processors, responsive to determining that the first sequence of characters of the license plate does not match any license plate information of the plurality of vehicle profiles, a first truncation operation by removing one or more characters from the first sequence of characters to generate a first truncated sequence of characters;

executing, by the one or more processors, a first search against the database using the first truncated sequence of characters;

determining, by the one or more processors, that the first search using the first truncated sequence of characters does not produce any matching license plate information in the database;

performing, by the one or more processors, responsive to determining that the first search using the first truncated sequence of characters does not produce any matching license plate information in the database, a second truncation operation by removing one or more additional characters from the first truncated sequence of characters to generate a second truncated sequence of characters;

executing, by the one or more processors, a second search against the database using the second truncated sequence of characters;

determining, by the one or more processors, that the second search using the second truncated sequence of characters produces a plurality of matching license plate information in the database;

identifying, by the one or more processors, responsive to determining that the second search using the second truncated sequence of characters produces the plurality of matching license plate information in the database, a vehicle profile of a vehicle corresponding to the matching license plate information and based on one or more of a vehicle characteristic, color, make, or model determined from the one or more images matching at least one of the color, make or model of the vehicle in the vehicle profile; and transmitting, by the one or more processors, i) to a car wash controller, instructions to cause the service facility to provide a service corresponding to the vehicle profile of the vehicle, or ii) to a gate actuator, a control signal to cause a state of a gate coupled to the gate actuator to change.

13. The method of claim 12, comprising:

extracting, by the one or more processors, from the one or more images of the vehicle, the first sequence of characters and a characteristic of the vehicle.

14. A non-transitory computer readable media storing instructions, which when executed by one or more processors, cause the one or more processors to:

maintain, in a database, a plurality of vehicle profiles for a plurality of vehicles, each vehicle profile of the plurality of vehicle profiles including license plate information of a respective vehicle of the plurality of vehicles and one or more vehicle characteristics, wherein the one or more vehicle characteristics includes a color, make, or model of the vehicle;

capture, via at least one image capture device directed towards a gate or a tunnel of a car wash, one or more images of at least a portion of a vehicle positioned within a region of interest of a service facility;

identify, using the one or more images, a string of characters of a license plate of the vehicle and one or more of a vehicle color, make or model of the vehicle;

determine one or more characters of the string of characters satisfy a character replacement schema;

generate a first sequence of characters by replacing the one or more characters in the string of characters that satisfy the character replacement schema with one or more corresponding replacement characters;

determine that the first sequence of characters of the license plate does not match any license plate information of the plurality of vehicle profiles;

perform, responsive to determining that the first sequence of characters of the license plate does not match any license plate information of the plurality of vehicle profiles, a first truncation operation by removing one or more characters from the first sequence of characters to generate a first truncated sequence of characters;

execute a first search against the database using the first truncated sequence of characters;

determine that the first search using the first truncated sequence of characters does not produce any matching license plate information in the database;

perform, responsive to determining that the first search using the first truncated sequence of characters does not produce any matching license plate information in the database, a second truncation operation by removing one or more additional characters from the first truncated sequence of characters to generate a second truncated sequence of characters;

execute a second search against the database using the second truncated sequence of characters;

determine that the second search using the second truncated sequence of characters produces a plurality of matching license plate information in the database;

identify, responsive to determining that the second search using the second truncated sequence of characters produces the plurality of matching license plate information in the database, a vehicle profile of a vehicle corresponding to the matching license plate information and based on one or more of a vehicle characteristic, color, make, or model determined from the one or more images matching at least one of the color, make or model of the vehicle in the vehicle profile; and transmit i) to a car wash controller, instructions to cause the service facility to provide a service corresponding to the vehicle profile of the vehicle, or ii) to a gate actuator, a control signal to cause a state of a gate coupled to the gate actuator to change.

* * * * *